US012078956B2

(12) United States Patent
Fujita et al.

(10) Patent No.: US 12,078,956 B2
(45) Date of Patent: Sep. 3, 2024

(54) IMAGE FORMING APPARATUS

(71) Applicant: CANON KABUSHIKI KAISHA, Tokyo (JP)

(72) Inventors: Keiko Fujita, Chiba (JP); Kentaro Yamana, Chiba (JP); Shigeo Doi, Ibaraki (JP); Yuya Yokobori, Chiba (JP); Hiroshi Nojima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/162,581

(22) Filed: Jan. 31, 2023

(65) Prior Publication Data

US 2023/0251602 A1 Aug. 10, 2023

(30) Foreign Application Priority Data

Feb. 7, 2022 (JP) ................................ 2022-016882

(51) Int. Cl.

*G03G 21/20* (2006.01)
*G03G 15/16* (2006.01)
*G03G 15/20* (2006.01)

(52) U.S. Cl.

CPC ......... *G03G 21/206* (2013.01); *G03G 15/161* (2013.01); *G03G 15/2028* (2013.01); *G03G 2215/0132* (2013.01); *G03G 2215/1661* (2013.01); *G03G 2221/1642* (2013.01)

(58) Field of Classification Search

USPC ........................................................... 399/69
See application file for complete search history.

(56) References Cited

U.S. PATENT DOCUMENTS

| | | | | |
|---|---|---|---|---|
| 2006/0072933 A1* | 4/2006 | Miyamoto | ........... | G03G 21/206 399/92 |
| 2007/0122186 A1* | 5/2007 | Kamimura | ........... | G03G 21/105 399/358 |
| 2014/0147160 A1 | 5/2014 | Konishi | | |

* cited by examiner

*Primary Examiner* — Quana Grainger
(74) *Attorney, Agent, or Firm* — Canon U.S.A., Inc. IP Division

(57) ABSTRACT

An image forming apparatus includes a photosensitive member, a transfer unit having a transfer belt, a primary transfer roller, a secondary transfer inner roller below the primary transfer roller in a vertical direction, and a stretching roller, a secondary transfer outer roller, a support unit, and an air duct provided in the transfer unit. The secondary transfer outer roller faces the secondary transfer inner roller via the transfer belt and forms a nip portion for secondarily transferring a toner image on the transfer belt to a sheet. The air duct is located downstream of the nip portion in a sheet conveyance direction and below a portion of the transfer belt stretched between the secondary transfer inner roller and the stretching roller in the vertical direction. The air duct includes an air intake port and moves with the transfer unit with movement of the transfer unit from the support unit.

14 Claims, 17 Drawing Sheets

IMAGE FORMING APPARATUS

BACKGROUND

Field

The present disclosure relates to an electrophotographic type image forming apparatus such as a copying machine, a printer, a facsimile, and a multifunction peripheral having a plurality of the foregoing functions.

Description of the Related Art

Conventional image forming apparatuses adopt an intermediate transfer method in which a toner image is primarily transferred from a photosensitive member to an intermediate transfer belt at a primary transfer portion and then secondarily transferred from the intermediate transfer belt to a recording material at a secondary transfer portion.

An image forming apparatus adopting the intermediate transfer method may include a lateral path structure in which a fixing unit is arranged in a lateral direction, which is a substantially horizontal direction, with respect to a secondary transfer portion at which a toner image is transferred from an intermediate transfer belt to a recording material.

In the image forming apparatus adopting the lateral path structure, heat generated from a fixing unit tends to stay in a space downstream of the secondary transfer portion in a conveyance direction of a recording material and below the intermediate transfer belt in a vertical direction.

If the intermediate transfer belt is affected by the heat generated from the fixing unit as described above, a state of toner on the intermediate transfer belt may change, and thus the toner cannot be normally transferred to a recording material, resulting in an image defect.

According to the United States Patent Application Publication No. 2014/0147160, a configuration is adopted that an air duct for forming an airflow is arranged in a space downstream of a secondary transfer portion in a conveyance direction of a recording material and below an intermediate transfer belt in the vertical direction so as to shield heat.

According to United States Patent Application Publication No. 2014/0147160, an image forming apparatus that includes an image forming unit including the intermediate transfer belt and a fixing unit within one housing is discussed as an example, but a similar issue can be considered to occur in an image forming apparatus that includes a plurality of housings. In other words, a similar issue can be considered to occur in an image forming apparatus includes two housings; a first housing including an intermediate transfer unit, and a second housing, adjacent to the first housing, including a fixing unit.

In a case of an image forming apparatus including a plurality of housings, a first housing has an opening through which a recording material is transferred to a second housing, and the second housing has an opening through which the recording material is received from the first housing. Thus, there is a possibility that heat from the fixing unit accumulates in a space downstream of a secondary transfer portion in the conveyance direction of the recording material in the first housing and below the intermediate transfer belt in the vertical direction through the respective openings.

Even in this configuration, if the air duct is arranged in the space downstream of the secondary transfer portion in the conveyance direction and below the intermediate transfer belt in the vertical direction as in United States Patent Application Publication No. 2014/0147160, it is possible to prevent the intermediate transfer belt from being affected by the heat from the fixing unit.

Meanwhile, a configuration in which a transfer unit including the intermediate transfer belt can be pulled out in a front direction of the image forming apparatus is sometimes adopted in order to facilitate maintenance work.

In this case, a frame that supports the transfer unit needs to have an opening on a front side that is large enough to pull out the transfer unit.

Therefore, in a case where the air duct is fixed to the frame, the air duct cannot be supported near the opening on the front side of the frame, and an unsupported end portion of the air duct may bend towards the gravitational direction due to its own weight, and the air duct may be deformed.

SUMMARY

According to an aspect of the present disclosure, an image forming apparatus includes a photosensitive member, a transfer unit having a transfer belt onto which a toner image formed on a photosensitive member is transferred, a primary transfer roller that faces the photosensitive member via the transfer belt and forms a primary transfer nip portion for primarily transferring the toner image formed on the photosensitive member to the transfer belt, a secondary transfer inner roller that is provided below the primary transfer roller in a vertical direction and in contact with an inner circumferential surface of the transfer belt, and a stretching roller for stretching the transfer belt that is provided between the secondary transfer inner roller and the primary transfer roller in a rotation direction of the transfer belt, a secondary transfer outer roller configured to face the secondary transfer inner roller via the transfer belt and to form a secondary transfer nip portion for secondarily transferring the toner image formed on the transfer belt to a recording material, a support unit configured to support the transfer unit to move along a rotation axis direction of the secondary transfer inner roller, and an air duct located downstream of the secondary transfer nip portion in a conveyance direction of a recording material and below a portion of the transfer belt stretched between the secondary transfer inner roller and the stretching roller in the vertical direction, wherein the air duct includes an air intake port and is provided in the transfer unit and is configured to move integrally with the transfer unit along with movement of the transfer unit from the support unit.

Further features of the present disclosure will become apparent from the following description of exemplary embodiments with reference to the attached drawings.

DESCRIPTION OF THE EMBODIMENTS

Exemplary embodiments according to the present disclosure will be described below with reference to the attached drawings. However, constituent components described in the following exemplary embodiments can be appropriately modified in their dimensions, materials, shapes, and relative layout according to a configuration and various conditions of an apparatus to which the present disclosure is applied, and they are not to be construed as intended to limit the scope of the present disclosure.

Image Forming System

Figure 1:
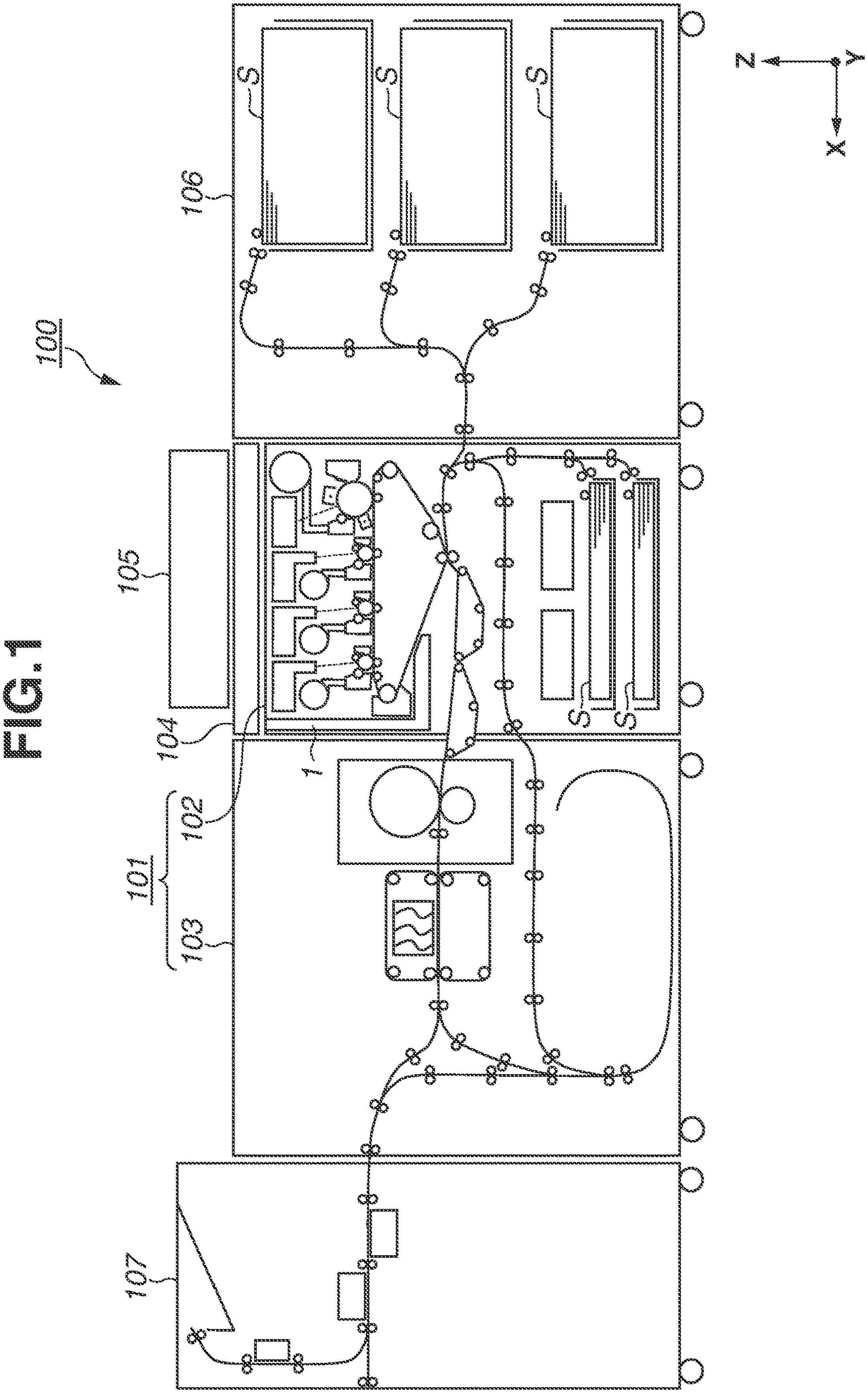
FIG. 1 is a schematic cross-sectional view of an image forming system including an image forming apparatus according to a first exemplary embodiment.

A first exemplary embodiment is described. FIG. 1 is a schematic cross-sectional view of an image forming system 100 including an image forming apparatus 101 according to the first exemplary embodiment of the present disclosure. The image forming apparatus 101 illustrated in FIG. 1 includes an image forming unit 102 that transfers a toner image to a conveyed sheet S and a fixing conveyance unit 103 that fixes the transferred toner image to the sheet S. The image forming unit 102 and the fixing conveyance unit 103 are each in an independent housing and movable using a plurality of casters provided on each. With this configuration, even a large apparatus can be separated down into independent housings, and the housings can be packed and transported individually, thereby improving workability during distribution until the apparatus is installed.

Above the image forming unit 102, a document reading apparatus 104 that reads a document image and a document feeding apparatus 105 that feeds a plurality of stacked documents one by one to the document reading apparatus 104 are selectively connected.

On an upstream side of the image forming unit 102 in the sheet feeding direction, any of a large capacity sheet feeding apparatus 106 including a plurality of sheet storage portions, a manual sheet feeding apparatus (not illustrated), or a long sheet feeding apparatus (not illustrated) capable of accommodating a long sheet can be selectively connected. On the upstream side of the large capacity sheet feeding apparatus 106, any of another large capacity sheet feeding apparatus (not illustrated), the manual sheet feeding apparatus, and the long sheet feeding apparatus can be selectively connected in a multiple manner.

On the downstream side of the fixing conveyance unit 103 in the sheet conveyance direction, a sensing apparatus 107 that reads the fixed toner image formed on one side or both sides of the sheet S is selectively connected. The sensing apparatus 107 is an apparatus that reads an image on a recording material in order to detect image density and image position deviation and perform feedback correction on an image signal to be transmitted to the image forming unit 102.

On the further downstream side of the fixing conveyance unit 103 or the sensing apparatus 107, one of or a combination of a plurality of various sheet processing apparatuses (not illustrated) such as an inserter, a puncher, a bookbinding device, a large capacity stacker, a folding machine, a finisher, and a trimmer can be selectively connected.

As described above, various optional apparatuses are selectively connected upstream and downstream in the sheet conveyance direction to the image forming apparatus 101 according to the present exemplary embodiment. Accordingly, it is possible to output a product obtained by performing various types of post-processing on various materials in an in-line manner and to provide the image forming system 100 that is excellent in high productivity, high image quality, high stability, and high functionality. According to the present exemplary embodiment, an arrow X direction, an arrow Y direction, and an arrow Z direction illustrated in the drawings respectively correspond to a width direction (right-and-left direction), a front-rear direction, and a vertical direction (up-and-down direction) of the image forming system 100.

Image Forming Apparatus: Image Forming Unit 102

Figure 2A:
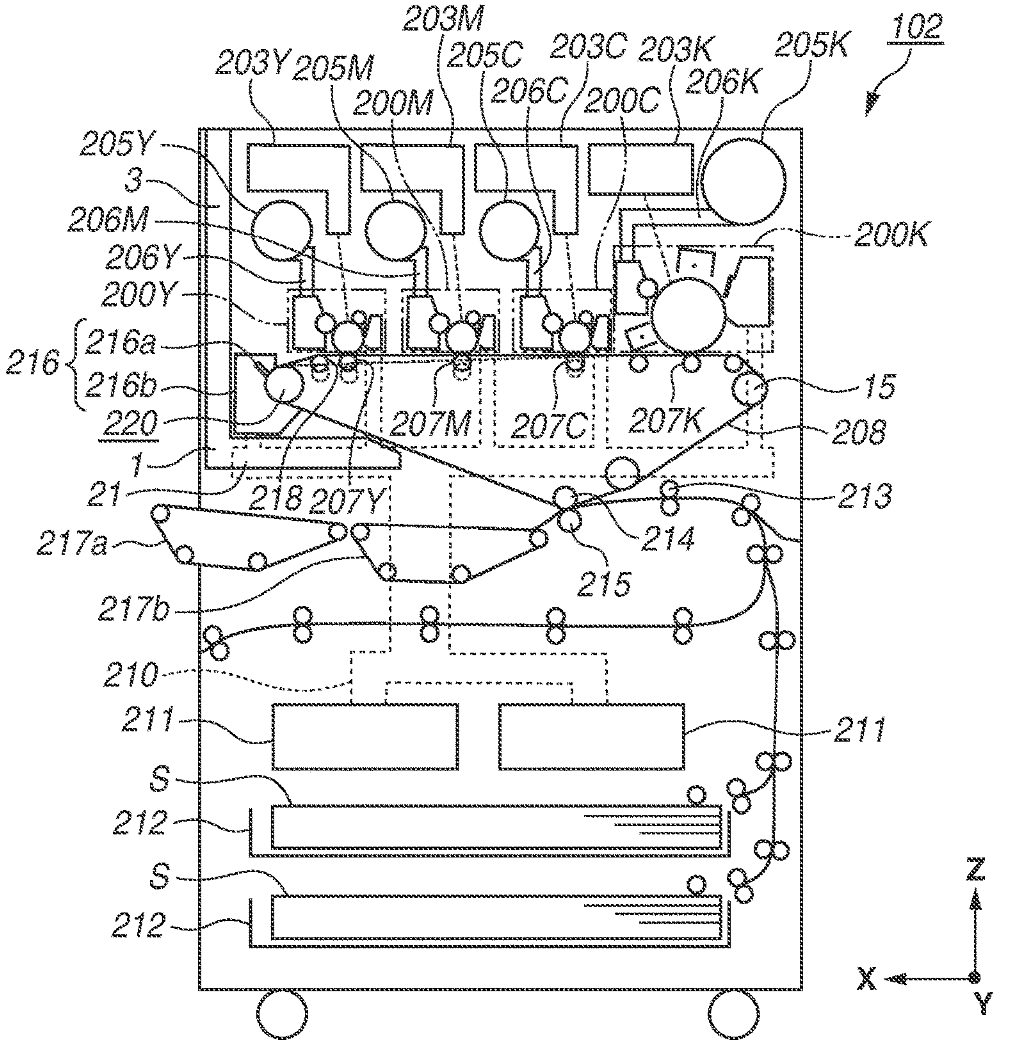
FIGS. 2A to 2C are schematic cross-sectional views of an image forming unit in the image forming apparatus according to the first exemplary embodiment.
Figure 2B:
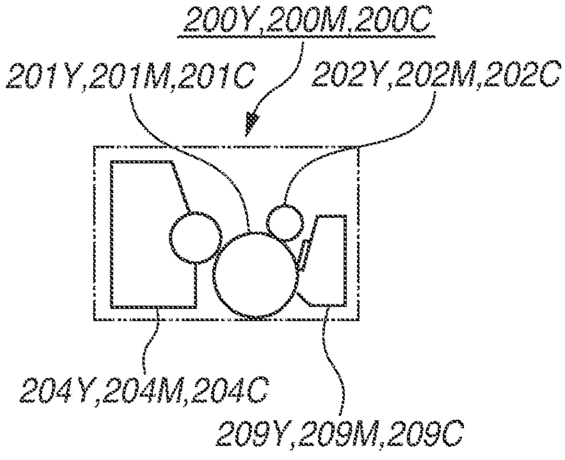
Figure 2C:
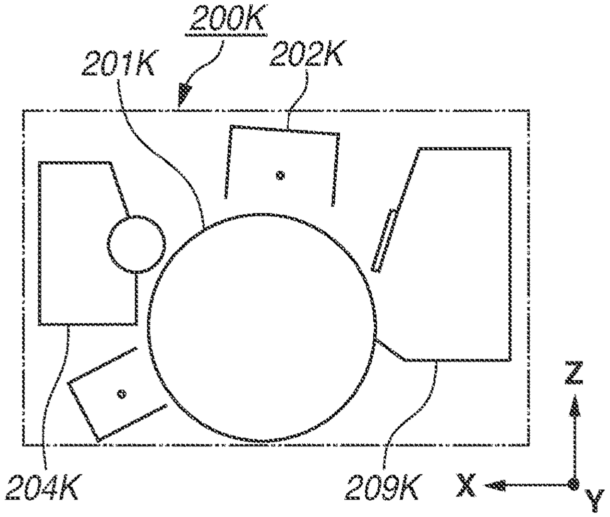

FIGS. 2A to 2C are schematic cross-sectional views of the image forming unit 102 in the image forming apparatus 101 according to the present exemplary embodiment. The image forming unit 102 illustrated in FIGS. 2A to 2C includes a plurality of image forming stations 200 that respectively form toner images of different colors of yellow (Y), magenta (M), cyan (C), and black (K). FIG. 2A is the schematic cross-sectional view of the entire image forming unit 102. FIG. 2B is the schematic cross-sectional view of the image forming stations 200Y, 200M, and 200C. FIG. 2C is the schematic cross-sectional view of the image forming station 200K.

As illustrated in FIG. 2A, a surface of a photosensitive drum 201 in each image forming station 200 is uniformly charged by a primary charging device 202, and then an electrostatic latent image is formed thereon by a laser scanner 203 driven based on a transmitted image information signal. The formed electrostatic latent image is developed into a toner image by a developing device 204. The photosensitive drum 201 according to the present exemplary embodiment is an example of a photosensitive member.

The toner consumed in the development in each developing device 204 is appropriately replenished from a toner bottle 205 through a toner supply path 206. Each of the image forming stations 200Y, 200M, and 200C differs only in the color of toner used and has a common configuration. In the following description, the common configuration is described by omitting the symbols Y, M, C, and K. A part of the configuration of the image forming station 200K has a function different from that of the image forming stations 200Y, 200M, and 200C, so that the different part is described below.

The toner image on each of the photosensitive drums 201 is applied with a predetermined pressure and an electrostatic load bias by a primary transfer roller 207 and is sequentially transferred to an intermediate transfer belt 208 at each primary transfer nip portion N1. In other words, the toner image is transferred to an outer circumferential surface of the intermediate transfer belt 208 by the primary transfer roller 207, which is in contact with an inner circumferential surface of the intermediate transfer belt 208. The intermediate transfer belt 208 is rotated clockwise in the drawing by a drive roller 220 in a state in which a tension roller 15 applies tension in a direction from the inner circumferential surface toward the outer circumferential surface of the intermediate transfer belt 208.

A small amount of residual toner remaining on the photosensitive drum 201 after transfer is removed by a photosensitive drum cleaner 209 to prepare for the next image formation. The removed residual toner is stored in a collected toner container 211 through a toner collection path 210.

Meanwhile, the sheet S fed one by one from a sheet storage unit (also referred to as a sheet feeding cassette) 212 inside the image forming unit 102 or from any of the sheet feeding apparatuses externally connected to the image forming apparatus 101 described above is subjected to skew correction by causing a leading end of the sheet S to follow a nip portion of a registration roller 213 to form a loop.

Subsequently, the registration roller 213 conveys the sheet S to a secondary transfer portion in synchronization with the toner image on the intermediate transfer belt 208.

The toner image on the intermediate transfer belt 208 is applied with a predetermined pressure and electrostatic load bias at a secondary transfer nip portion N2 formed by a secondary transfer inner roller 214 and a secondary transfer outer roller 215 and thus is transferred to the sheet S. In other words, the toner image is transferred to the outer circumferential surface of the intermediate transfer belt 208 by the secondary transfer inner roller 214 in contact with the inner circumferential surface of the intermediate transfer belt 208 and the secondary transfer outer roller 215 located on the outer circumferential surface of the intermediate transfer belt 208. A small amount of the residual toner remaining on the intermediate transfer belt 208 after transfer is removed by an intermediate transfer belt cleaner 216 to prepare for the next image formation.

The intermediate transfer belt cleaner 216 includes a blade 216*a* that abuts on the outer circumferential surface of the intermediate transfer belt 208 at a position facing the drive roller 220 and a collection unit 216*b* that collects the toner scraped off by the blade 216*a*. The residual toner removed by the intermediate transfer belt cleaner 216 is stored in the collected toner container 211 through the toner collection path 210. The intermediate transfer belt cleaner 216 is an example of a cleaning unit that cleans the outer circumferential surface of the intermediate transfer belt 208.

The sheet S onto which the toner image is transferred is conveyed to the fixing conveyance unit 103 on the downstream side by pre-fixing conveyance belts 217*a* and 217*b*.

Image Forming Apparatus: Monochrome Image Formation

The image forming apparatus 101 according to the present exemplary embodiment can perform full-color image formation using all of the image forming stations 200 of yellow, magenta, cyan, and black described above, as well as monochrome image formation using only the image forming station 200K of black.

At the time of monochrome image forming, the primary transfer roller 207 and a primary transfer auxiliary roller 218 are separated from the intermediate transfer belt 208 using a separation mechanism (not illustrated). The image forming stations 200Y, 200M, and 200C of which primary transfer nip portions of yellow, magenta, and cyan are separated from the intermediate transfer belt 208 can stop rotational driving. In other words, in the image forming stations 200Y, 200M, and 200C of yellow, magenta, and cyan, unnecessary wear of parts due to unnecessary rotational driving can be prevented, a long service life can be achieved.

On the other hand, the photosensitive drum 201K has a larger diameter suitable for a longer service life than the photosensitive drums 201Y, 201M, and 201C. As illustrated in FIG. 2C, a primary charging device 202K is configured with a non-contact type corona charging device, which is suitable for a longer service life than the primary charging devices 202Y, 202M, and 202C with a contact type roller charging device. Further, a toner bottle 205K has a larger capacity suitable for a longer service life than toner bottles 205Y, 205M, and 205C.

With the above-described configuration, even for a user who frequently uses monochrome image forming, a maintenance interval of the image forming station 200K of black, which is frequently used, can be prevented from becoming shorter than those of the image forming stations 200Y, 200M, and 200C of yellow, magenta, and cyan, which are less frequently used.

In addition, the large-diameter drum configuration using the corona charging device 202K has a wider charging width and is more suitable for high speed processing than the small-diameter drum configuration using the roller charging devices 202Y, 202M, and 202C, thereby improving productivity in the monochrome image forming.

In the image forming unit 102, in which the image forming stations 200 have different conditions as described above, a difference may occur in a toner charge amount on the photosensitive drum 201 due to a difference in shape and wear amount. If there is a difference in the toner charge amount, the toner image may not be transferred uniformly onto the sheet S in the secondary transfer process, resulting in an image defect. Thus, the photosensitive drum 201K of black is provided with a pre-transfer charging device, which is a corona charging device for adjusting the toner charge amount to those of the photosensitive drums 201Y, 201M, and 201C of yellow, magenta, and cyan. The pre-transfer charging device is an example of another charging unit provided between a developing device 204K and a photosensitive drum cleaner 209K in a rotation direction of the photosensitive drum 201K.

As described above, according to the configuration of the present exemplary embodiment, it is possible to provide the image forming apparatus 101 that is excellent in high productivity, high image quality, high stability, and a long service life not only in full-color image forming but also in monochrome image forming.

Image Forming Apparatus: Fixing Conveyance Unit 103

Figure 3:
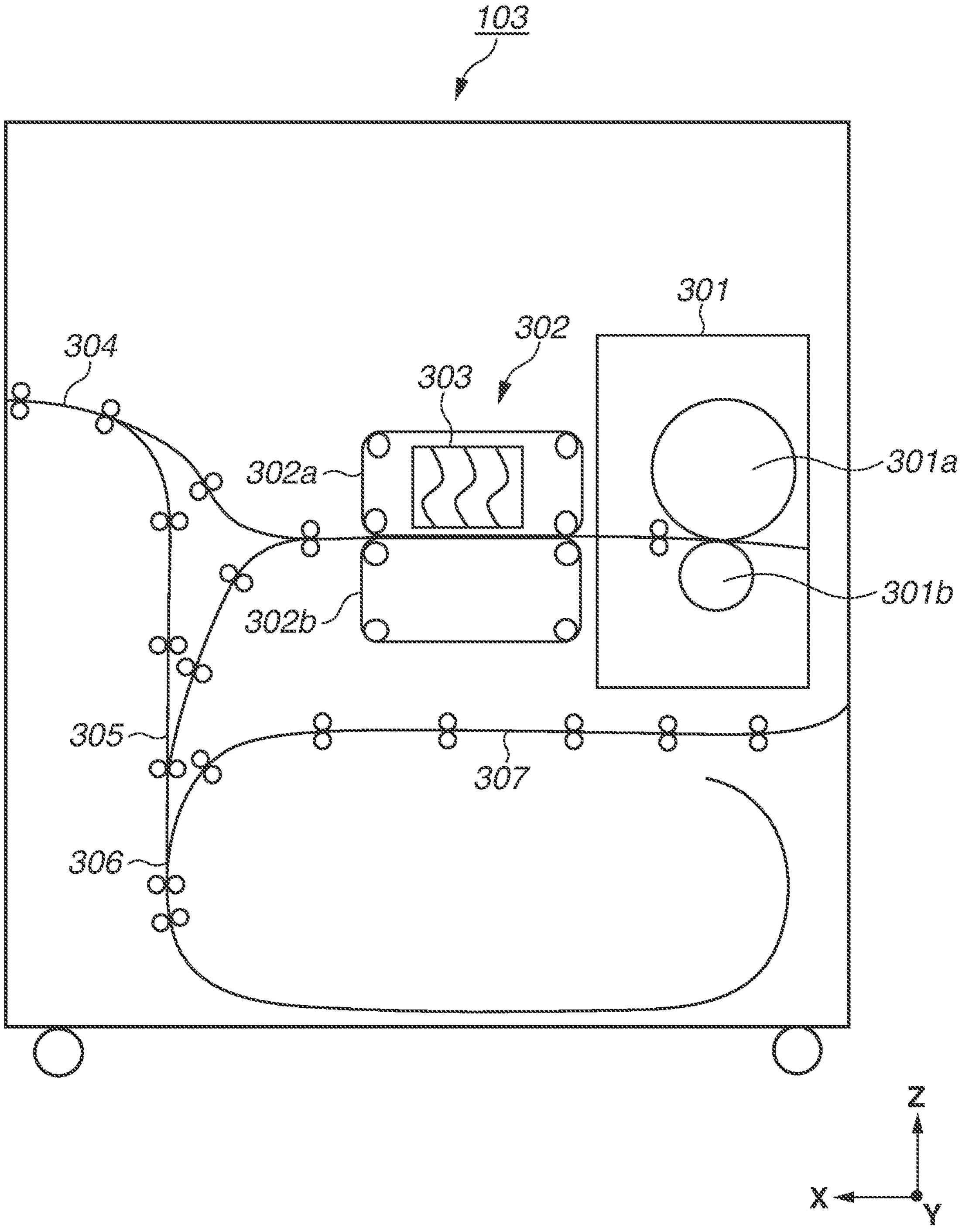
FIG. 3 is a schematic cross-sectional view of a fixing conveyance unit in the image forming apparatus according to the first exemplary embodiment.

FIG. 3 is a schematic cross-sectional view of the fixing conveyance unit 103 in the image forming apparatus 101 according to the present exemplary embodiment. A fixing unit 301 illustrated in FIG. 3 heats and presses the toner image on the sheet S conveyed from the image forming unit 102 to fix it on the sheet S.

According to the present exemplary embodiment, the fixing unit 301 includes a heating roller 301*a* that is heated by a heating unit (not illustrated) on an upper side in the vertical direction and a pressure roller 301*b* that presses the sheet S against the heating roller 301*a* on a lower side in the vertical direction. The sheet S on which the toner image is formed is heated and pressed at a fixing nip formed by the heating roller 301*a* and the pressure roller 301*b*, so that the toner image is fixed. The heating roller 301*a* and the pressure roller 301*b* nip and convey the sheet S downstream in the sheet conveyance direction while heating and pressurizing the sheet S. Here, the fixing unit 301 that includes a pair of rollers is described as an example, but may form a fixing nip with a conveyance belt. The heating roller 301*a* is an example of a first rotating member, and the pressure roller 301*b* is an example of a second rotating member.

The sheet S heated by the fixing unit 301 is conveyed by conveyance belts 302*a* and 302*b* of a cooling unit 302 while being cooled by heat absorption of a heat sink 303 that is in contact with an inner surface of the conveyance belt 302*a*. Then, the sheet S is discharged to the above-described sensing apparatus 107 or a post-processing apparatus (not illustrated) through a sheet discharge conveyance path 304.

In a case where the sheet S is to be turned front to back and discharged, switchback conveyance is performed in a sheet discharge reversing portion 305 to reverse a leading end and a trailing end of the sheet S, and the sheet S is discharged via the sheet discharge conveyance path 304 in a state in which the front and back sides are reversed.

In a case where images are to be formed on both sides of the sheet S, switchback conveyance is performed in a double-sided reversing portion 306 to reverse the leading end and the trailing end of the sheet S with an image formed on a first surface thereof, and the sheet S is conveyed to a double-sided conveyance path 307 in a state in which the front and back sides are reversed. Subsequently, the sheet S is conveyed to the registration roller 213 again in time with a timing when a subsequent sheet S is fed from the sheet storage unit 212 inside the image forming unit 102 or from any of the above-described sheet feeding apparatuses externally connected to the image forming unit 102. Then, an image is formed on a second surface of the sheet S in a similar process to the first surface, and the sheet S is discharged through the sheet discharge conveyance path 304.

Configuration of Air Duct

As illustrated in FIGS. 1 and 2A to 2C, in the image forming apparatus 101 according to the present exemplary embodiment, an air duct 1 (also referred to as an air duct unit 1) is arranged downstream of the secondary transfer nip portion N2 and upstream of the fixing conveyance unit 103 in the sheet conveyance direction.

Figure 17:
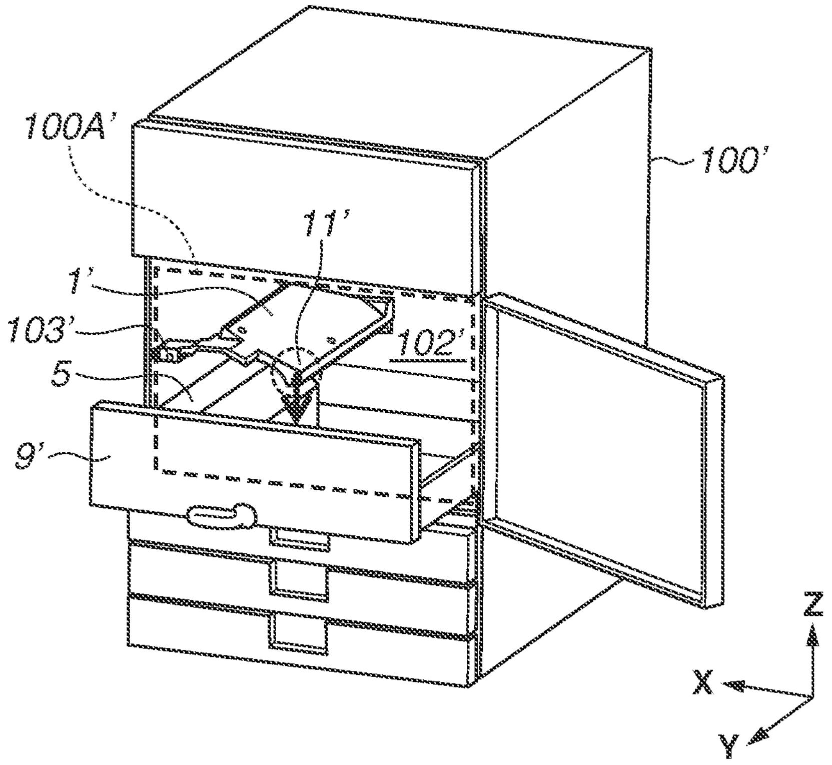
FIG.17 PRIOR ART
FIG. 17 is a schematic perspective view illustrating an air duct according to a conventional technique.

FIG. 17 is a perspective view illustrating a configuration of a conventional air duct. In FIG. 17, units located near the air duct, such as an intermediate transfer belt unit, are not illustrated for the sake of simplicity of illustration. A conventional image forming apparatus 100' may often adopt a configuration in which an intermediate transfer belt unit and other components can be pulled out to the front of the apparatus (the arrow Y direction) for maintenance purposes. In this case, a main body frame that supports the intermediate transfer belt unit needs to have an opening 100A' on the front of the apparatus to insert and remove the intermediate transfer belt unit.

In the conventional configuration, an air duct 1', which is arranged to divide a space downstream of the secondary transfer portion in a conveyance direction of the recording material and below the intermediate transfer belt in the vertical direction, is supported by the main body frame that also supports each unit in the image forming apparatus 100'. More specifically, a rear side of the air duct 1' is fixed to a rear side plate 102' of the main body frame, and a front side of the air duct 1' is supported by a duct fixing member 103' on one end side in the width direction of the image forming apparatus 100'. The duct fixing member 103' is fixed to a left support rod (not illustrated) of the main body frame, a stay connecting the left support rod and the rear side plate 102', and the like. Meanwhile, there is no main body frame in the vicinity of the center in the width direction (the arrow X direction) of the image forming apparatus 100' in order to provide the opening 100A'. Thus, the air duct 1' has a configuration in which a free end portion 11' located on the front side of the image forming apparatus 100' and on the center side in the width direction of the image forming apparatus 100' is not supported by the main body frame.

Therefore, the free end portion 11' of the conventional air duct 1' is easy to bend under its own weight, and there is a risk of deformation of the air duct 1'. In addition, in a case where a conveyance unit 9' located below the intermediate transfer belt unit is pulled out, there is a possibility that an upper surface of the conveyance unit 9' will rub against the air duct 1', which may impair user's operation feeling.

Therefore, according to the present exemplary embodiment, the air duct, which is arranged to divide a space downstream of the secondary transfer portion in the conveyance direction of the recording material and below the intermediate transfer belt in the vertical direction, is fixed to the intermediate transfer unit in order to prevent deformation of the air duct due to its own weight.

Figure 4:
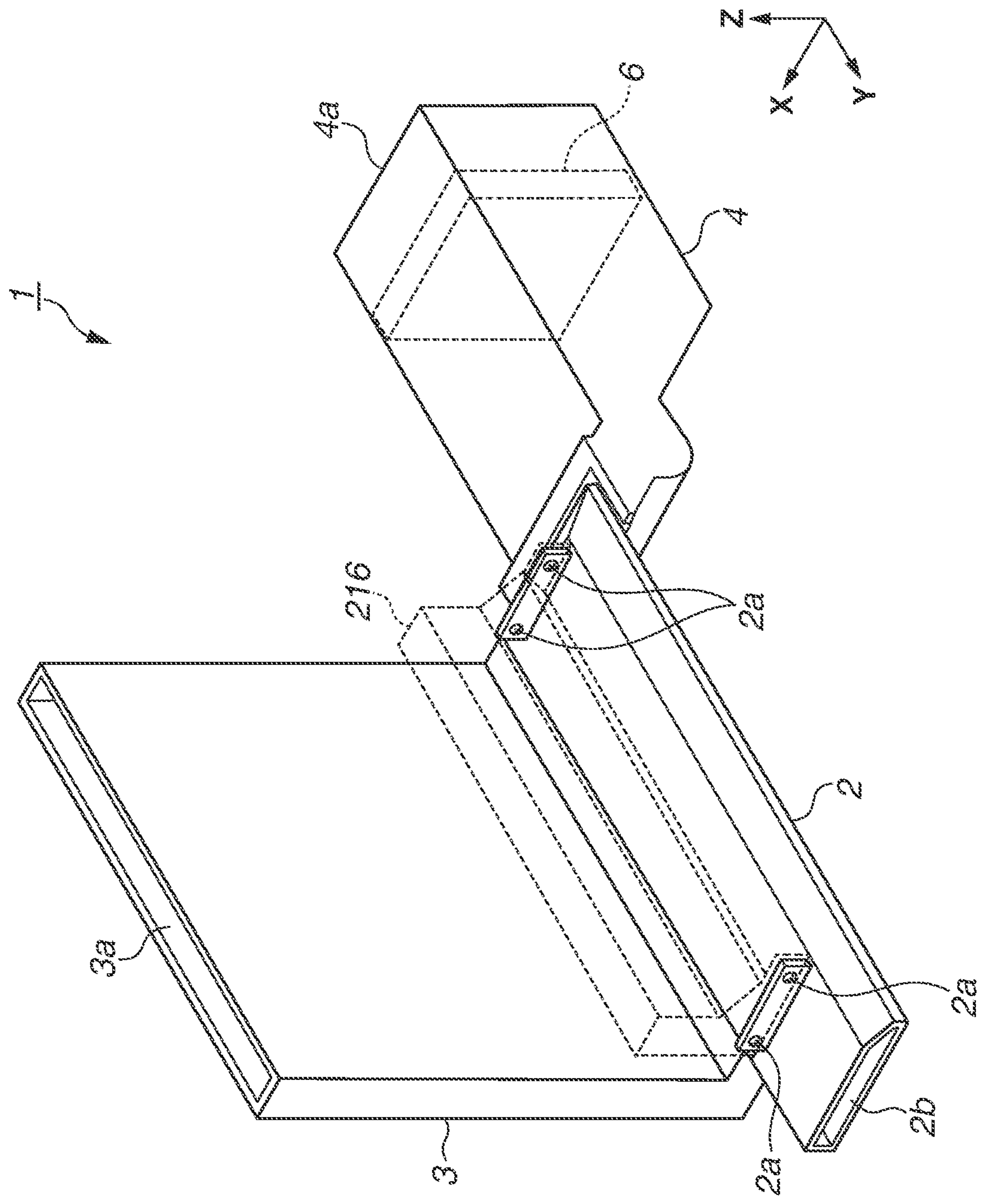
FIG. 4 is a perspective view illustrating a configuration of an air duct according to the first exemplary embodiment.

FIG. 4 is a perspective view illustrating the configuration of the air duct 1 according to the present exemplary embodiment. As illustrated in FIG. 4, the air duct 1 according to the present exemplary embodiment includes three members, a first duct 2, a second duct 3, and a third duct 4.

The first duct 2 is arranged below the intermediate transfer belt 208 and above the pre-fixing conveyance belts 217*a* and 217*b* in the vertical direction. The first duct 2 is fixed to the intermediate transfer belt cleaner 216 indicated by dotted lines in FIG. 4 by screws fastened through four positioning holes 2*a* illustrated in FIG. 4.

In FIG. 4, the screws are fastened through the two positioning holes 2*a* on a front side (the arrow Y direction), and thus the first duct 2 is fixed to the intermediate transfer belt cleaner 216 on the front side. Further, in FIG. 4, the screws are fastened through the two positioning holes 2*a* on a rear side (an arrow in a minus Y direction), and thus the first duct 2 is fixed to the intermediate transfer belt cleaner 216 on the rear side. In other words, the first duct 2 is fixed to the intermediate transfer belt cleaner 216 so as to sandwich the intermediate transfer belt cleaner 216 in the front-rear direction of the image forming apparatus 101.

As described above, the first duct 2 is supported in a well-balanced manner at substantially four corners of the first duct 2 by the screws inserted through the four positioning holes 2*a*. Thus, it is possible to prevent the end portion of the first duct 2 from bending due to its own weight, as in the conventional example illustrated in FIG. 17. Accordingly, it is possible to provide the image forming apparatus 101 that can secure an enough space for jam clearance operation above the pre-fixing conveyance belts 217*a* and

217*b*, which is not reduced by bending of the air duct 1, and thus can improve operability of a user performing the jam clearance operation.

Next, an airflow in the air duct unit 1 is described. An opening 2*b* is formed on a front end of the first duct 2 and communicates with louver holes 5*a* (in FIGS. 5A and 5B) formed on a front door 5 of the image forming unit 102 to serve as a first air intake port for taking outside air into the inside of the air duct 1. The first duct 2 is arranged to divide a space downstream of the secondary transfer portion in the conveyance direction of the recording material and below the intermediate transfer belt 208 in the vertical direction as illustrated in FIG. 1. In other words, the first duct 2 is arranged below a portion of the intermediate transfer belt 208 stretched between the secondary transfer inner roller 214 and the drive roller 220 in the vertical direction. Thus, the heat of the fixing unit leaking from an opening of the fixing conveyance unit 103 can be blocked by forming an airflow in the first duct 2, and it is possible to prevent the intermediate transfer belt 208 from being affected by the heat of the fixing unit.

The second duct 3 is joined to the first duct 2 on the side of the intermediate transfer belt 208, is provided at a position between the intermediate transfer belt 208 and the fixing unit 301 in the width direction (the arrow X direction), and extends in the vertical direction (the arrow Z direction). The second duct 3 is supported on a side surface of the housing (not illustrated) of the image forming unit 102. An opening 3*a* is formed on an upper end of the second duct 3 to communicate with louver holes formed on an upper surface of the housing (not illustrated) of the image forming unit 102 and serves as a second air intake port for taking outside air into the inside of the air duct 1.

As described above, the second duct 3 is provided between the intermediate transfer belt 208 and the fixing unit 301 in the width direction of the image forming apparatus 101, so that it is possible to prevent the intermediate transfer belt 208 from being affected by the heat transmitted from the fixing unit 301 via the side surface of the housing.

The third duct 4 is joined to the first duct 2 at a position on a rear side of the intermediate transfer belt 208 in the front-rear direction (the arrow Y direction). In other words, the third duct 4 is arranged adjacent to a rear surface of the image forming unit 102. The third duct 4 is supported by the rear surface of the housing (not illustrated) of the image forming unit 102. An opening 4*a* is formed at a trailing end of the third duct 4. The opening 4*a* communicates with louver holes formed on a rear cover (not illustrated) of the image forming unit 102 and serves as an exhaust port of the air duct 1.

An air blowing fan 6 is disposed inside the third duct 4. The outside air taken into the air duct 1 through the first air intake port 2*b* and the second air intake port 3*a* described above is efficiently exhausted through the exhaust opening 4*a* by the air blowing fan 6. Thus, the airflow formed inside the air duct 1 can prevent the intermediate transfer belt 208 from being affected by the heat from the fixing unit 301.

With the configuration of the air duct 1 described above, it possible to block the image forming unit 102 from being affected by the heat from the fixing unit 301. In other words, it is possible to prevent an image defect caused by a change in a charging characteristic due to excessive temperature rise of the toner in the image forming unit 102, malfunction such as toner clogging caused by deterioration in the fluidity of the toner, and occurrence of downtime for cooling the excessively high temperature of the toner. Accordingly, it is possible to provide the image forming apparatus 101 that is excellent in high image quality, high stability, high productivity, and a long service life.

Jam Clearance Operation and Maintenance Work Procedure in Conveyance Unit

Next, a maintenance procedure for a conveyance unit 7 is described with reference to FIGS. 5A and 5B.

Figure 5A:
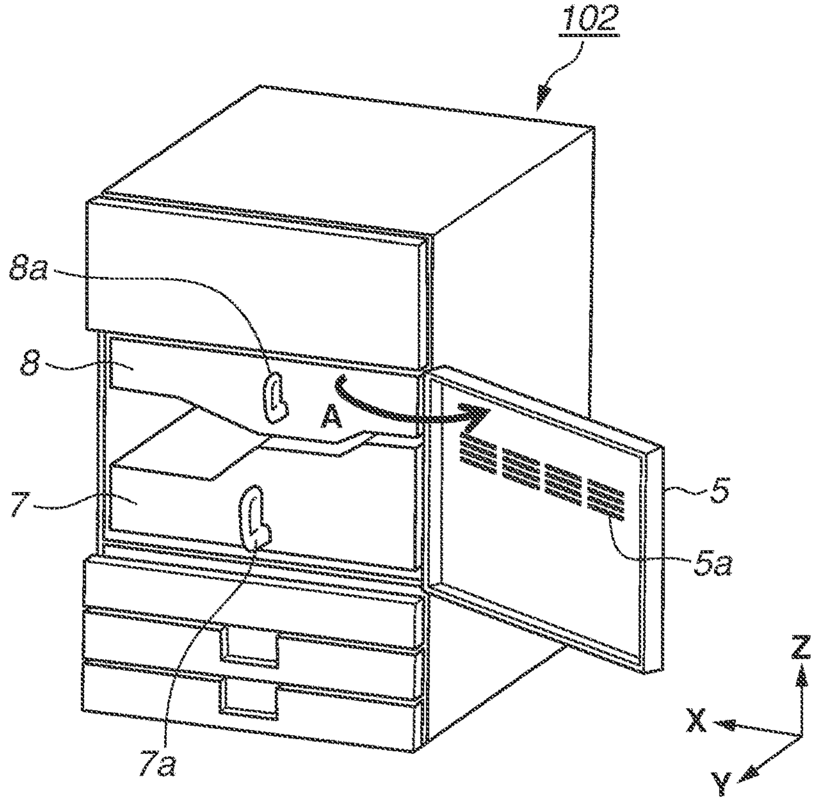
FIGS. 5A and 5B are perspective views illustrating jam clearance operation and a maintenance work procedure for a conveyance unit according to the first exemplary embodiment.
Figure 5B:
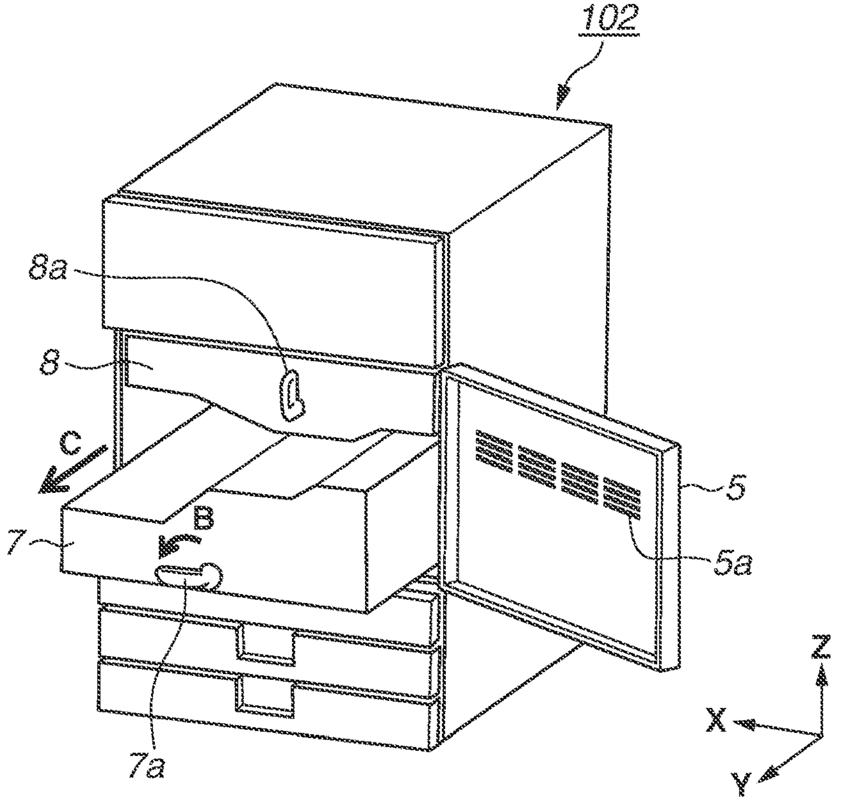

First, the front door 5 of the image forming unit 102 is opened in an arrow A direction as illustrated in FIG. 5A. Next, a handle 7*a* of the conveyance unit 7 is rotated in an arrow B direction as illustrated in FIG. 5B. The conveyance unit 7 is unlocked from the apparatus housing (a support frame) by this rotating operation of the handle 7*a* and can be pulled out to the front side of the apparatus indicated by an arrow C using a slide mechanism (not illustrated). The support frame as a support unit that supports the conveyance unit 7 in a slidable and movable manner is provided inside the image forming unit 102. The arrow C direction is a rotation axis direction of the secondary transfer outer roller 215 and a rotation axis direction of the secondary transfer inner roller 214.

In a state where the conveyance unit 7 is pulled out (FIG. 5B), a user can perform jam clearance operation in the conveyance unit 7 by detaching conveyance guides (not illustrated) arranged above and below the conveyance unit 7. In addition, a service person can perform maintenance such as cleaning and replacing a part the inside of the conveyance unit 7. The conveyance unit 7 includes the pre-fixing conveyance belt 217*b* and conveyance rollers that are located below the intermediate transfer belt 208 in the vertical direction, such as the secondary transfer outer roller 215 and the registration roller 213.

Intermediate Transfer Belt Replacement Operation Procedure

Figure 6A:
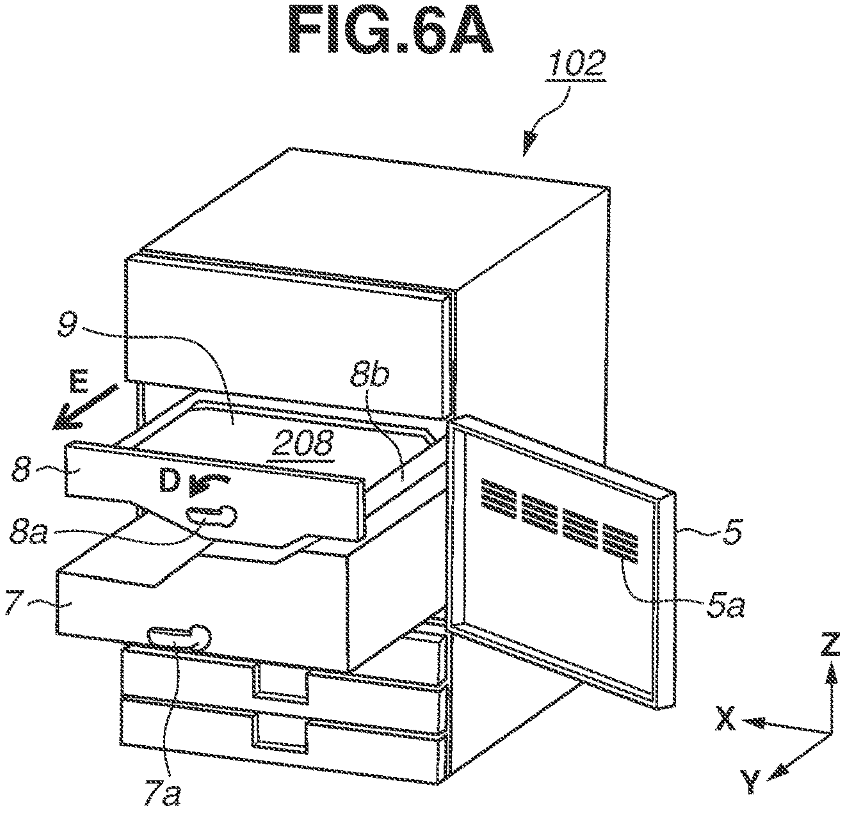
FIGS. 6A and 6B are perspective views illustrating a transfer unit in a pulled-out state according to the first exemplary embodiment.

Next, a replacement procedure for the intermediate transfer belt 208 is described with reference to FIGS. 6A and 6B. As illustrated in FIG. 6A, a handle 8*a* of a transfer unit 8 that a service person can operate is rotated in an arrow D direction. By this operation, a transfer belt unit 9 inside the transfer unit 8 is moved downward, and the intermediate transfer belt 208 and the photosensitive drum 201 are separated. Accordingly, the transfer unit 8 can be pulled out from the support frame of the image forming unit 102 toward the front of the image forming apparatus 101 indicated by an arrow E direction. The handle 8*a* is an example of an operating lever that is rotated to move the intermediate transfer belt 208 in a direction away from the photosensitive member.

The arrow E direction is the rotation axis direction of the secondary transfer inner roller 214. The support frame of the image forming apparatus 101 also supports the sheet feeding cassette 212 such that the sheet feeding cassette 212 can slidably move forward.

As illustrated in FIG. 6A, the transfer belt unit 9 located inside the transfer unit 8 can be removed upward from a support frame 8*b* of the transfer unit 8 at a position where the transfer unit 8 is pulled out.

The transfer belt unit 9 includes the intermediate transfer belt 208, a plurality of rollers on which the intermediate transfer belt 208 is stretched, a transfer cleaner unit 12, and a post-intermediate transfer upper guide 13. The transfer cleaner unit 12 includes the intermediate transfer belt cleaner 216 and the first duct 2 fixed to the intermediate transfer belt cleaner 216 as described above.

The perspective view in FIG. 6A illustrates a state in which both of the conveyance unit 7 and the transfer unit 8 are pulled out to the front of the image forming apparatus 101, but it is also possible to pull out only the transfer unit 8 in a state in which the conveyance unit 7 is mounted at a mounting position inside the image forming apparatus 101 (the state illustrated in FIG. 5A).

Figure 6B:
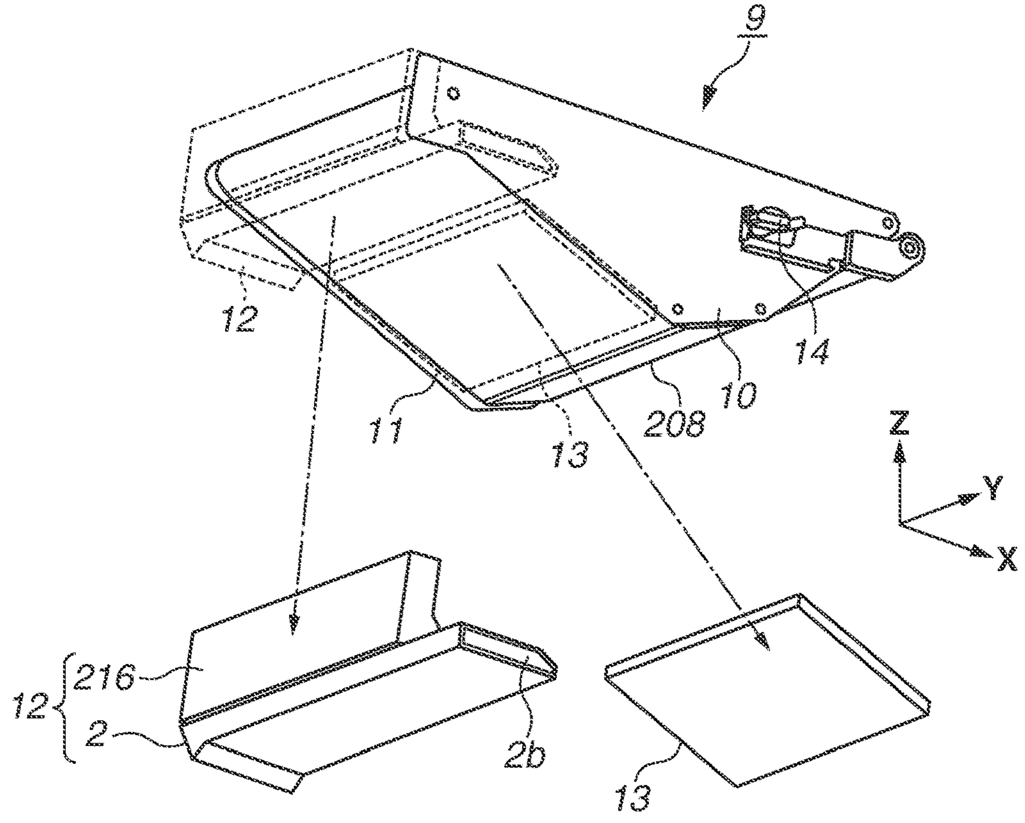

FIG. 6B illustrates the transfer belt unit 9 removed from the support frame 8*b* of the transfer unit 8. As illustrated in FIG. 6B, the transfer belt unit 9 includes a front side plate 10 provided on a front side and a rear side plate 11 provided on a rear side. The front side plate 10 and the rear side plate 11 rotatably support the plurality of rollers on which the intermediate transfer belt 208 is stretched. Thus, the intermediate transfer belt 208 is located between the front side plate 10 and the rear side plate 11 in the front-rear direction (the arrow Y direction).

The front side plate 10 and the rear side plate 11 also support the above-described intermediate transfer belt cleaner 216 by being fastened thereto with screws (not illustrated). In other words, the first duct 2 fixed to the intermediate transfer belt cleaner 216 is indirectly supported by the front side plate 10 and the rear side plate 11.

As indicated by dotted lines in FIG. 6B, the opening 2*b* of the first duct 2 is located on the front side of the front side plate 10 in the front-rear direction (the arrow Y direction). In other words, the opening 2*b* of the first duct 2 is located outside an end portion of the intermediate transfer belt 208 in the rotation axis direction of the secondary transfer inner roller 214. Accordingly, the intake air from the opening 2*b* of the first duct 2 is not hindered in the configuration in which the first duct 2 is supported by the transfer belt unit 9.

As described above, the first duct 2 is positioned and fixed to each of the front side plate 10 and the rear side plate 11 of the transfer belt unit 9. Thus, in a case where the transfer belt unit 9 is pulled out from the image forming unit 102, the first duct 2 is pulled out together with the transfer belt unit 9 supporting the intermediate transfer belt 208.

The first duct 2 is also fixed to the intermediate transfer belt cleaner 216. Accordingly, even if the above-described conveyance unit 7 is pulled out to the position illustrated in FIG. 6B, the first duct 2 does not bend due to its own weight and does not come into contact with an upper surface of the conveyance unit 7 when the conveyance unit 7 is slid to move forward. Thus, it is possible to improve the operability of a user when the user slides and moves the conveyance unit 7.

Next, as illustrated in FIG. 6B, the transfer cleaner unit 12 and the post-intermediate transfer upper guide 13 provided on the outer circumferential surface side of the intermediate transfer belt 208 are removed from the mounting positions indicated by dotted lines in the removed transfer belt unit 9. Accordingly, all members arranged between the front side plate 10 and the rear side plate 11 of the transfer belt unit 9, such as the transfer cleaner unit 12 and the post-intermediate transfer upper guide 13, are removed, and the entire outer circumferential surface of the intermediate transfer belt 208 is exposed.

Figure 7A:
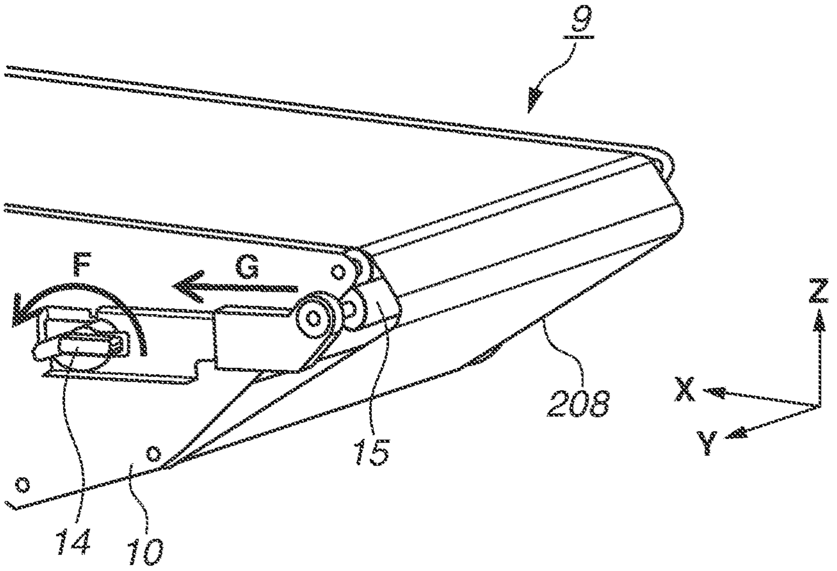
FIGS. 7A and 7B are perspective views illustrating a work procedure for changing an intermediate transfer belt according to the first exemplary embodiment.

Next, as illustrated in FIG. 7A, a cam lever 14 is rotated in an arrow F direction. By this rotating operation of the cam lever 14, the tension roller 15 that applies tension to the intermediate transfer belt 208 is moved in an arrow G direction to retreat from the inner circumferential surface of the intermediate transfer belt 208, and the tension applied to the intermediate transfer belt 208 by a force of a spring (not illustrated) is released.

Figure 7B:
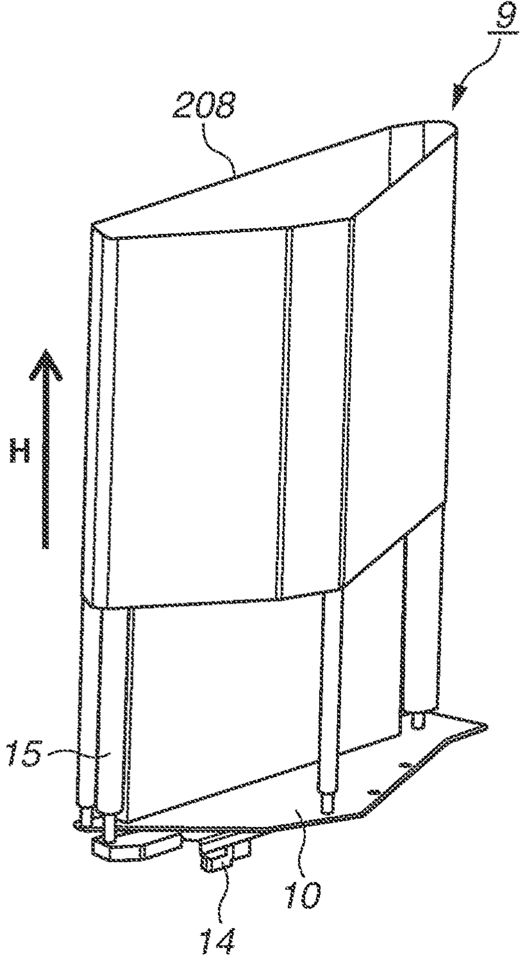

Finally, as illustrated in FIG. 7B, the intermediate transfer belt 208, which is in a slack state with tension released, is removed from the transfer belt unit 9 in an arrow H direction. Subsequently, a new intermediate transfer belt 208 is mounted in a reverse order of the above-described procedure, and the replacement work of the intermediate transfer belt 208 is completed.

As described above, the first duct 2 according to the present exemplary embodiment can be removed as the transfer cleaner unit 12 together with the intermediate transfer belt cleaner 216. Thus, even in a case where the first duct 2, which is a part of the air duct 1, is supported inside the transfer belt unit 9, there is no increase in work procedures for replacing the intermediate transfer belt 208 by a service person. Accordingly, it is possible to provide the image forming apparatus 101 that is excellent in maintenance workability while keeping working hours to a minimum.

Configuration of Joint Portions of Air Duct

Figure 8A:
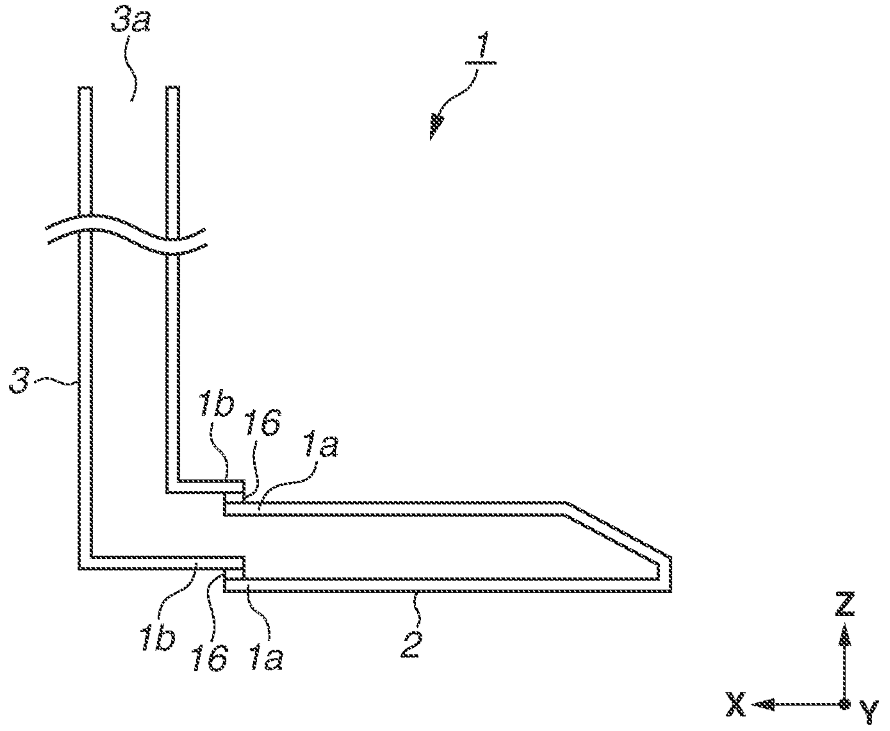
FIGS. 8A and 8B are cross-sectional views illustrating a joint portion between a first duct and a second duct of the air duct according to the first exemplary embodiment.
Figure 8B:
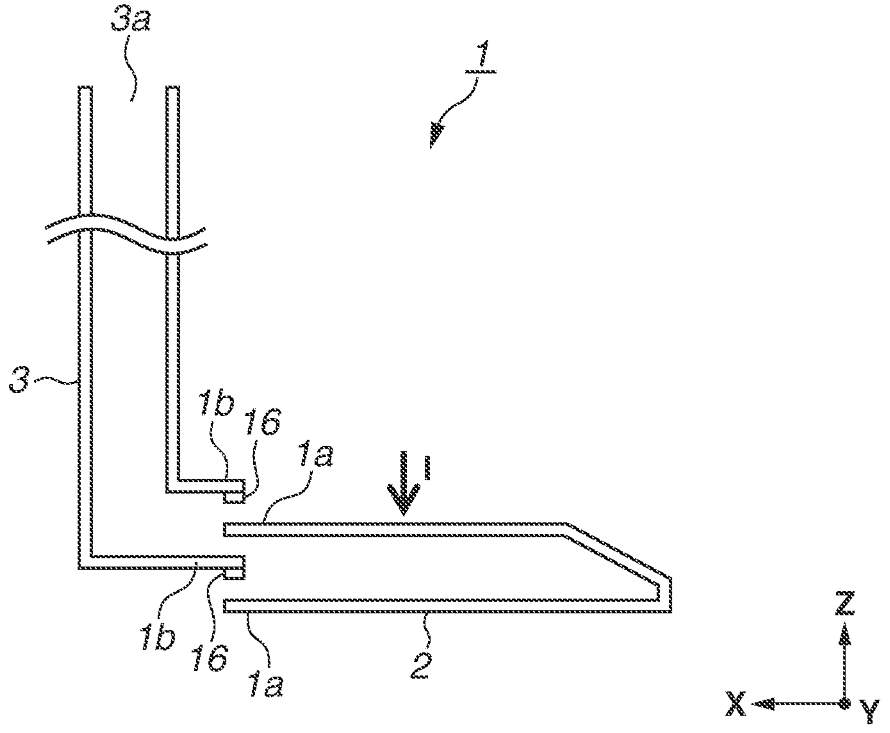
Figure 9A:
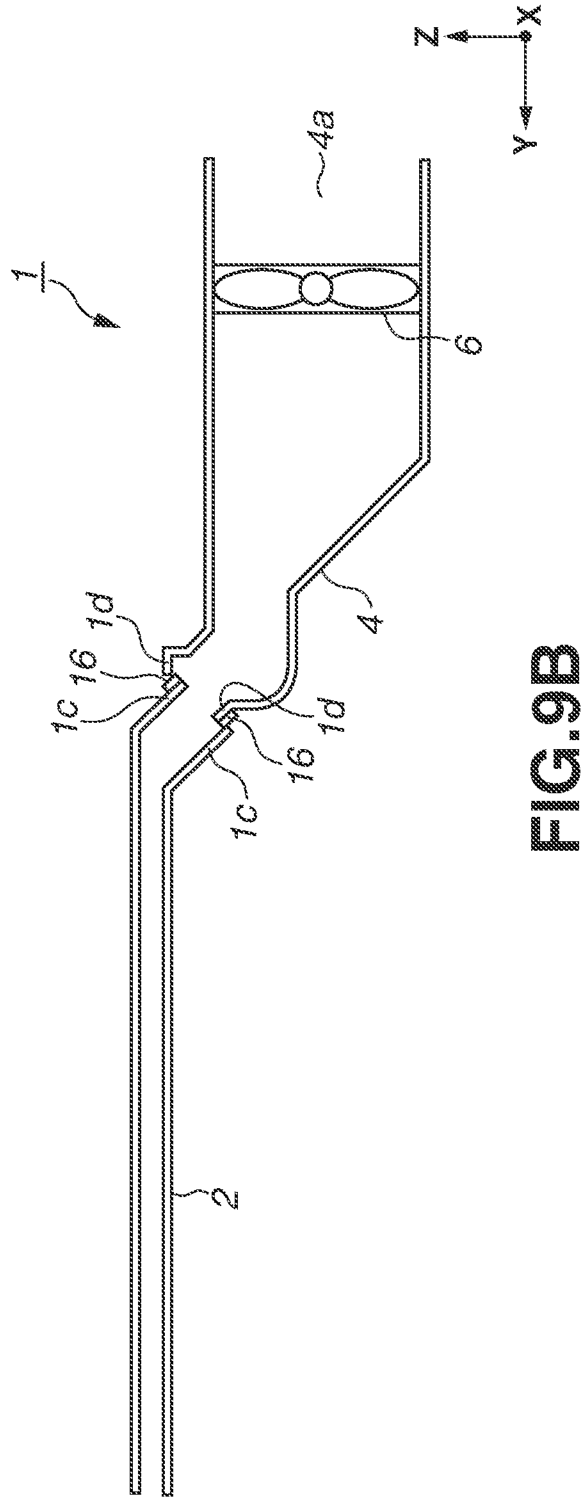
FIGS. 9A and 9B are cross-sectional views illustrating a joint portion between the first duct and a third duct of the air duct according to the first exemplary embodiment.
Figure 9B:
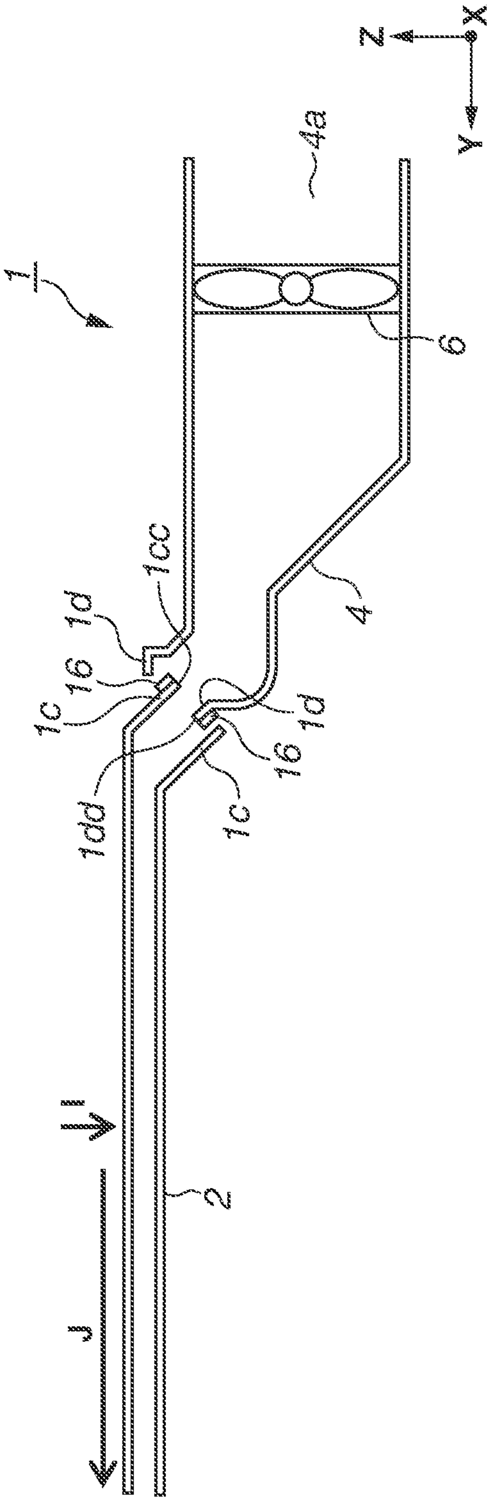

FIGS. 8A and 8B are cross-sectional views of joint portions 1*a* and 1*b* between the first duct 2 and the second duct 3 of the air duct 1. FIGS. 9A and 9B are cross-sectional views of joint portions 1*c* and 1*d* between the first duct 2 and the third duct 4 of the air duct 1.

FIG. 8A illustrates a mounting state in which the transfer unit 8 is pressed upward and the outer circumferential surface of the intermediate transfer belt 208 and the photosensitive drum 201 are in contact with each other. In other words, the transfer unit 8 is in a state illustrated in FIG. 5A. In this state, the joint portion 1*a* of the first duct 2 and the joint portion 1*b* of the second duct 3 are in contact with each other and form the duct.

FIG. 8B illustrates a state in which the transfer unit 8 is moved downward, and the outer circumferential surface of the intermediate transfer belt 208 and the photosensitive drum 201 are separated. In other words, the transfer unit 8 is in a state illustrated in FIG. 6A. In this state, the first duct 2 is moved downward together with the transfer unit 8 as indicated by an arrow I in FIG. 8B, so that the joint portion 1*a* of the first duct 2 and the joint portion 1*b* of the second duct 3 are separated. Then, the first duct 2 is pulled out to the front side (the arrow Y direction) illustrated in FIG. 8B together with the transfer unit 8 as illustrated in FIG. 6A. At this time, a distance to the second duct 3 remaining in the apparatus main body is sufficiently far, so that the ducts do not rub against each other, and the operability is not impaired.

FIG. 9A illustrates the mounting state in which the transfer unit 8 is pressed upward, and the outer circumferential surface of the intermediate transfer belt 208 and the photosensitive drum 201 are in contact with each other. In other words, the transfer unit 8 is in the state illustrated in FIG. 5A. In this state, the joint portion 1*c* of the first duct 2 and the joint portion 1*d* of the third duct 4 are in contact with each other to form the duct.

FIG. 9B illustrates the state in which the transfer unit 8 is moved downward, and the outer circumferential surface of the intermediate transfer belt 208 and the photosensitive drum 201 are separated. In other words, the transfer unit 8 is in the state illustrated in FIG. 6A. In this state, the first duct 2 is moved downward together with the transfer unit 8 as indicated by the arrow I in FIG. 9B, so that the joint portion 1*c* of the first duct 2 and the joint portion 1*d* of the third duct 4 are separated. In the state illustrated in FIG. 9B, a lower end 1*cc* on an upper side of the joint portions 1*c* of the first duct 2 in the vertical direction is located at a position higher than an upper end 1*dd* on a lower side of the joint portions 1*d* of the third duct 4 in the vertical direction.

Then, the first duct 2 is pulled out to the front side of the apparatus indicated by an arrow J in FIG. 9B together with the transfer unit 8 as illustrated in FIG. 6A. At this time, however, a distance to the third duct 4 remaining in the apparatus main body is sufficiently far, so that the ducts do not rub against each other, and the operability is not impaired.

In other words, the joint portion 1*a* of the first duct 2 and the joint portion 1*b* of the second duct 3, and the joint portion 1*c* of the first duct 2 and the joint portion 1*d* of the third duct 4 are joint together or separated from each other in accordance with a separation operation of the intermediate transfer belt 208 and the photosensitive drum 201. Further, the joint portion 1*a* of the first duct 2 and the joint portion 1*b* of the second duct 3, and the joint portion 1*c* of the first duct 2 and the joint portion 1*d* of the third duct 4 are separated from each other by rotating the handle 8*a* in the arrow D direction at the time of pulling out the transfer unit 8. Since the joint state among the first duct 2, the second duct 3, and the third duct 4 is released, interference among the ducts can be prevented in the operation of pulling out the intermediate transfer unit 8 from image forming unit 102. Thus, it is possible to prevent impairment of the operability at the time of pulling out the intermediate transfer unit 8 that can be caused by the ducts rubbing against each other.

In this case, if a sealing member 16 made of an elastic material is provided between the joint portion 1*a* of the first duct 2 a and the joint portion 1*b* of the second duct 3, and between the joint portion 1*c* of the first duct 2 and the joint portion 1*d* of the third duct 4, sealing performance between the joint portions 1*a* and 1*b* and between the joint portions 1*d* and 1*d* is improved. Thus, in addition to improving heat shielding efficiency of the air duct 1, it is possible to prevent toner from scattering caused by air leaking from the air duct 1 to the outside and a conveyance jam, so that the image forming apparatus 101 with excellent high stability can be provided.

Next, a second exemplary embodiment is described. According to the present exemplary embodiment, an image forming apparatus includes one housing unlike the first exemplary embodiment. In other words, an image forming apparatus in which an intermediate transfer belt and a fixing unit are accommodated in one housing is used in the present exemplary embodiment.

Image Forming Apparatus

Figure 10:
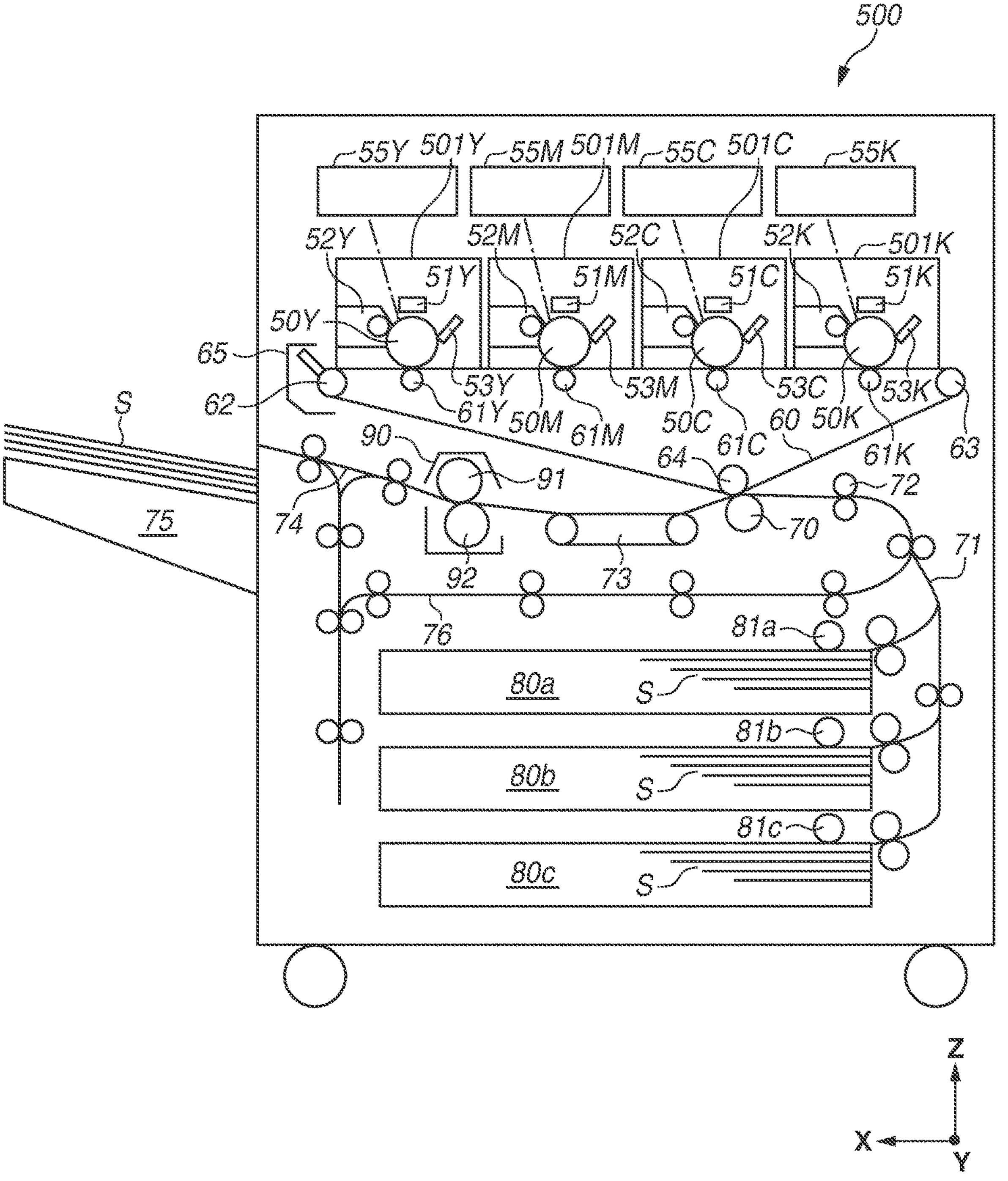
FIG. 10 is a schematic cross-sectional view of an image forming apparatus according to a second exemplary embodiment.

FIG. 10 is a schematic cross-sectional view of the image forming apparatus according to the present exemplary embodiment. An image forming apparatus 500 according to the present exemplary embodiment is an image forming apparatus using a tandem type intermediate transfer method in which image forming units 501Y, 501M, 501C, and 501K are arranged in series on a horizontal portion of an intermediate transfer belt 60. The image forming apparatus 500 forms a full-color image on a sheet S using the electrophotographic method in accordance with an image signal transmitted from an external device or a reading apparatus (not illustrated).

The image forming units 501Y, 501M, 501C, and 501K respectively include photosensitive drums 50Y, 50M, 50C, and 50K on which color toner images of yellow, magenta, cyan, and black are respectively formed. The image forming units 501Y, 501M, 501C, and 501K differ only in the color of the toner image to be formed, and have the same configuration, so that the image forming unit 501Y of yellow is described here as an example.

A charging device 51Y that charges the photosensitive drum 50Y, an exposure apparatus 55Y that irradiates the photosensitive drum 50Y with light to form an electrostatic latent image, and a developing device 52Y that transfers toner to the electrostatic latent image formed on the photosensitive drum 50Y to form a toner image are provided in the vicinity of the photosensitive drum 50Y.

The toner image formed on the photosensitive drum 50Y as described above is temporarily transferred to the intermediate transfer belt 60 by a primary transfer roller 61Y. A nip portion formed by the photosensitive drum 50Y and the primary transfer roller 61Y via the intermediate transfer belt 60 is a primary transfer nip portion N1.

A cleaning apparatus 53Y that removes the toner remaining on the photosensitive drum 50Y after the primary transfer of the toner image is provided downstream of the primary transfer nip portion N1 in the rotation direction of the photosensitive drum 50Y.

The intermediate transfer belt 60 is rotated while being stretched on a drive roller 62, a tension roller 63, and a secondary transfer inner roller 64 for performing secondary transfer. The drive roller 62 is driven by a motor (not illustrated), and the intermediate transfer belt 60 is rotated by the rotation of the drive roller 62. Tension is applied to the tension roller 63 by an urging member (not illustrated) in a direction from an inner circumferential surface to an outer circumferential surface of the intermediate transfer belt 60.

The toner images formed by the respective image forming units 501 are transferred to the intermediate transfer belt 60 at the primary transfer portions and then are transferred to the sheet S by a secondary transfer outer roller 70 facing the secondary transfer inner roller 64 via the intermediate transfer belt 60. A nip portion formed by the secondary transfer inner roller 64 and the secondary transfer outer roller 70 via the intermediate transfer belt 60 is a secondary transfer nip portion N2. The drive roller 62 is an example of a stretching roller that is provided between the secondary transfer inner roller 64 and the primary transfer roller 61 in the rotation direction of the intermediate transfer belt 60 and stretches the intermediate transfer belt 60.

Meanwhile, the sheet S stored in a sheet feeding cassette 80*a*, 80*b*, or 80*c* is conveyed to a sheet feeding conveyance path 71 by rotation of a sheet feeding roller 81*a*, 81*b*, or 81*c*. Then, the sheet S conveyed through the sheet feeding conveyance path 71 is fed by a registration roller 72 to the secondary transfer portion formed by the secondary transfer inner roller 64 and the secondary transfer outer roller 70 in time with the toner image on the intermediate transfer belt 60. Accordingly, the toner image is formed on the sheet S at the secondary transfer portion. Transfer residual toner remaining on the intermediate transfer belt 60 after the secondary transfer is removed by a cleaner unit 65. The cleaner unit 65 is an example of a cleaning unit that cleans the outer circumferential surface of the intermediate transfer belt 60.

The cleaner unit 65 includes a blade 36 that abuts on the outer circumferential surface of the intermediate transfer belt 60 at a position facing the drive roller 62, a collection unit 37 that collects the toner scraped off by the blade 36, and a collected toner conveyance screw 38 that conveys the collected toner.

Then, the sheet S onto which the toner image is transferred is conveyed to a fixing unit 90 by a conveyance belt 73. In the fixing unit 90, the toner image is fixed to a surface of the sheet S by being heated and pressed at a fixing nip formed by a heating roller 91 heated by a heating unit (not illustrated) and a pressure roller 92. The heating roller 91 is an example of a first rotating member, and the pressure roller 92 is an example of a second rotating member. According to the present exemplary embodiment, rollers are used for both of the heating roller 91 and the pressure roller 92, but a rotating member such as a belt may be used.

In a case of single-sided printing, the sheet S on which the toner image is fixed is discharged to a sheet discharge tray 75 through a sheet discharge conveyance path 74. In a case of double-sided printing, the sheet S is conveyed through a reversing conveyance path 76 and is conveyed again to the secondary transfer portion in a state in which the front and back sides of the sheet S are reversed, and thus images are formed on both sides of the sheet S. Then, the toner images are fixed by the fixing unit 90 as in single-sided printing, and the sheet S is discharged to the sheet discharge tray 75.

Configuration of Fixing Heat Exhausting Duct

Figure 11:
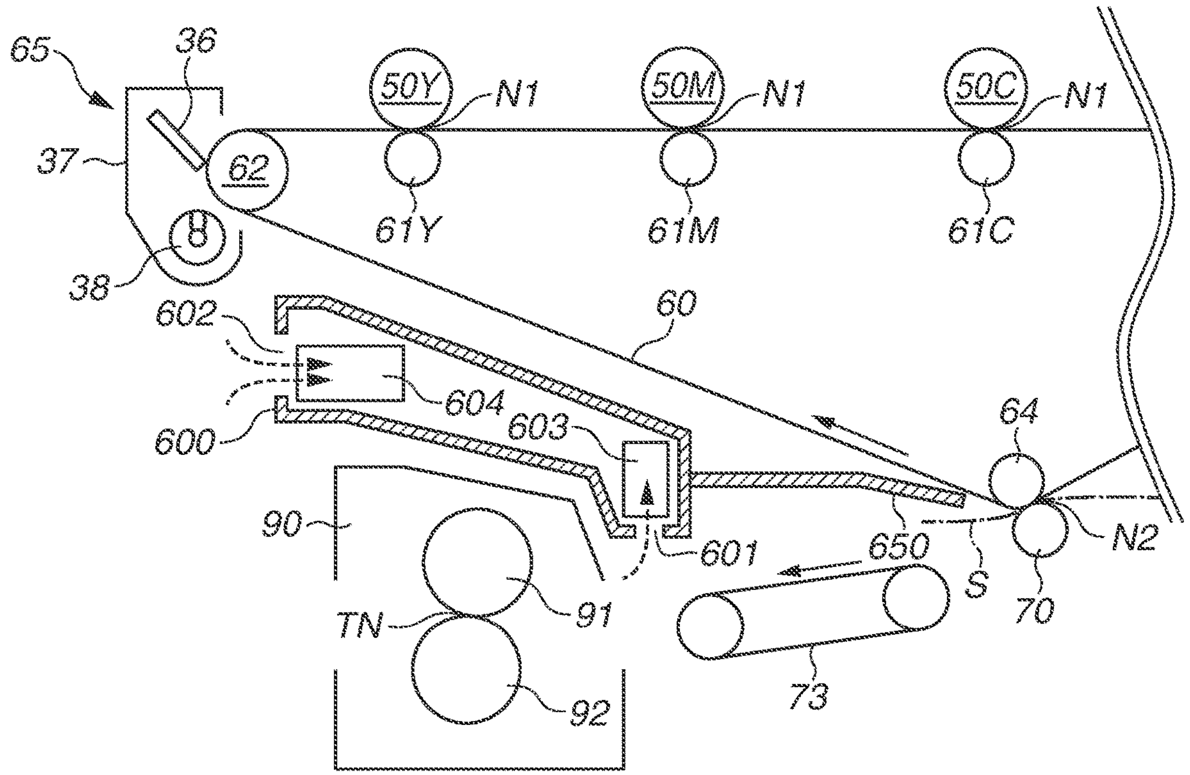
FIG. 11 is a schematic cross-sectional view illustrating a configuration of an air duct according to the second exemplary embodiment.

Next, a fixing heat exhausting duct configuration in the image forming apparatus according to the present disclosure is described with reference to FIG. 11.

According to the present exemplary embodiment, a fixing heat exhausting duct 600 is provided downstream of the secondary transfer portion in the sheet conveyance direction and between the intermediate transfer belt 60 and the fixing unit 90 in the vertical direction. Specifically, the fixing heat exhausting duct 600 is provided in a space downstream of the secondary transfer portion in the sheet conveyance direction and below the intermediate transfer belt 60 in the vertical direction. In other words, the fixing heat exhausting duct 600 is arranged below a portion of the intermediate transfer belt 60 stretched between the secondary transfer inner roller 64 and the drive roller 62 in the vertical direction.

Accordingly, an airflow is formed inside the fixing heat exhausting duct 600, so that heat emitted from the fixing unit 90 is blocked, and thus a temperature rise of the intermediate transfer belt 60 is prevented. Further, a temperature rise around the photosensitive drum 50 that is in contact with the intermediate transfer belt 60 is also prevented by blocking the heat emitted from the fixing unit 90.

The fixing heat exhausting duct 600 takes air into the duct through an air intake port 601 provided upstream of the fixing nip TN of the fixing unit 90 and an air intake port 602 provided downstream of the fixing nip TN. Further, exhaust ports 603 and 604 for exhausting the air in the duct are provided on a rear side of the fixing heat exhausting duct 600 in the front-rear direction of the image forming apparatus 500.

The fixing heat exhausting duct 600 is connected to a main body duct 880 (FIGS. 16A and 16B), which is arranged on the rear side of the main body and incorporates a fan, so that an airflow is generated inside the fixing heat exhausting duct 600, and air is taken through the air intake ports 601 and 602.

Air around an inlet for the sheet S of fixing unit 90 is mainly taken through the air intake port 601, and air around an outlet for the sheet S of fixing unit 90 or around the collected toner conveyance screw 38 is taken through the air intake port 602. Accordingly, the temperature rise of the intermediate transfer belt 60, the blade 36, and the collected toner conveyance screw 38 is prevented, and an image defect caused by sticking of toner or the like is prevented.

The fixing heat exhausting duct 600 includes a post-secondary transfer upper guide 650. The post-secondary transfer upper guide 650 is an example of a guide unit provided to prevent the sheet S stuck to the intermediate transfer belt 60 from reaching the cleaner unit 65.

For example, in a case where the sheet S is thin paper, after the sheet S passes through the secondary transfer nip portion N2 formed the secondary transfer inner roller 64 and the secondary transfer outer roller 70, the sheet S may be attracted to the intermediate transfer belt 60 by electrostatic attractive force generated on the charged sheet S.

To address this issue, according to the present exemplary embodiment, the post-secondary transfer upper guide 650 is arranged to extend from an upstream side to a downstream side of the secondary transfer nip portion N2 in the conveyance direction, so that the sheet S is prevented from sticking to the intermediate transfer belt 60.

Accordingly, it is possible to prevent occurrence of an image defect and sheet removal work due to the sheet S sticking to the intermediate transfer belt 60 reaching the cleaner unit 65.

Jam Clearance Operation and Maintenance Work Procedure in Fixing Conveyance Unit Next, an attachment/detachment configuration of the fixing conveyance unit in the image forming apparatus according to the present disclosure is described with reference to FIGS. 12A and 12B.

In a case where a sheet jam occurs in the image forming apparatus 500 or in a case where maintenance related to durability is performed, it is necessary to access a sheet material conveyance path inside the apparatus.

Figure 12A:
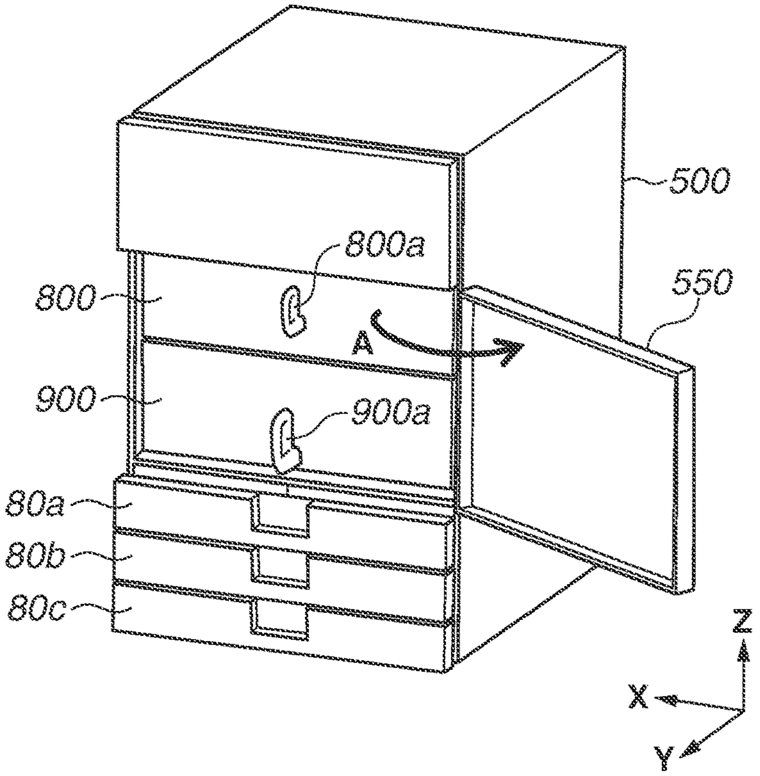
FIGS. 12A and 12B are perspective views illustrating jam clearance operation and a maintenance work procedure for a conveyance unit according to the second exemplary embodiment.
Figure 12B:
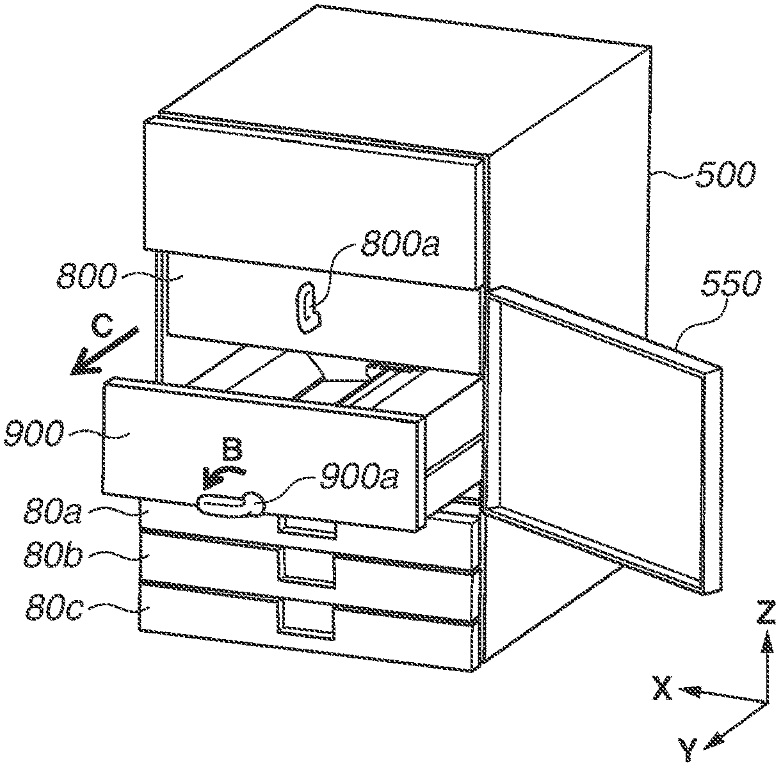

According to the present exemplary embodiment, after a front door 550 is opened in the arrow A direction, a lock handle 900*a* is rotated by 90 degrees in the arrow B direction in a state where a fixing conveyance unit 900 is mounted on the image forming apparatus 500 as illustrated in FIG. 12A. The fixing conveyance unit 900 is unlocked from the apparatus housing (not illustrated) by the rotating operation of the lock handle 900*a* and can be pulled out to the front side of the apparatus indicated by the arrow C using a slide mechanism (not illustrated). A support frame as a support unit that supports the fixing conveyance unit 900 in a slidable and movable manner is provided inside the image forming apparatus 500. The arrow C direction is a rotation axis direction of the secondary transfer outer roller 70 and a rotation axis direction of the secondary transfer inner roller 64.

At a position where the fixing conveyance unit 900 is pulled out from the support frame of the image forming apparatus 500, by detaching conveyance guides (not illustrated) arranged above and below the fixing conveyance unit 900, a user can perform jam clearance operation in the fixing conveyance unit 900. In addition, a service person can perform maintenance such as cleaning the inside of the fixing conveyance unit 900 and replacing a part. The fixing conveyance unit 900 includes the conveyance belt 73, the fixing unit 90, and conveyance rollers that are located below the intermediate transfer belt 60 in the vertical direction, such as the secondary transfer outer roller 70 and the registration roller 72.

Intermediate Transfer Belt Replacement Work Procedure

Figure 13:
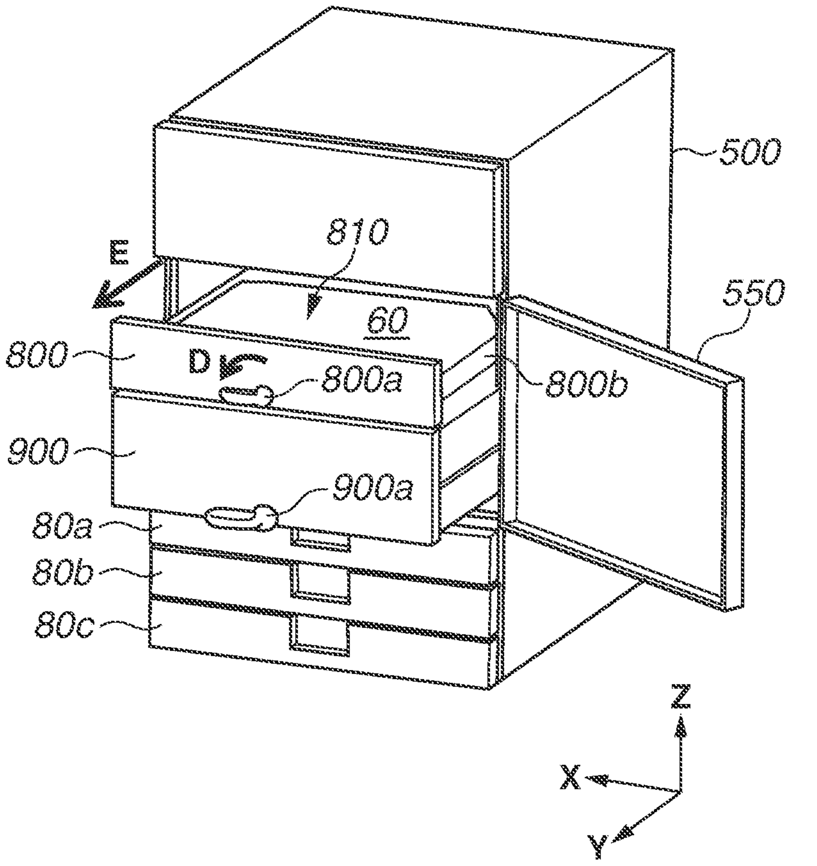
FIG. 13 is a perspective view illustrating a transfer unit in a pulled-out state according to the second exemplary embodiment.

Next, as illustrated in FIG. 13, a handle 800*a* of a transfer unit 800 that a service person can operate is rotated 90 degrees in the arrow D direction. By this rotating operation of the handle 800*a*, a transfer belt unit 810 inside the transfer unit 800 is moved downward in the vertical direction, and the intermediate transfer belt 60 and the photosensitive drum 50 are separated. Accordingly, the transfer unit 800 can be pulled out forward from the support frame of the image forming apparatus 500 as indicated by the arrow E direction. The handle 800*a* is an example of an operating lever that is rotated to move the intermediate transfer belt 60 in a direction away from the photosensitive drum 50.

The arrow E direction is the rotation axis direction of the secondary transfer inner roller 64. The support frame of the image forming apparatus 500 also supports the sheet feeding cassettes 80*a* to 80*c* such that they can slide forward.

As illustrated in FIG. 13, an internal transfer belt unit 810 inside the transfer unit 800 can be taken out from above of a support frame 800*b* of the transfer unit 800 at the position where the transfer unit 800 is pulled out.

According to the present exemplary embodiment, the transfer belt unit 810 includes the intermediate transfer belt 60, a plurality of rollers on which the intermediate transfer belt 60 is stretched, the cleaner unit 65, and the post-intermediate transfer upper guide 13. The transfer cleaner unit 12 includes the intermediate transfer belt cleaner 216 and the above-described fixing heat exhausting duct 600.

A perspective view in FIG. 13 illustrates a state in which both of the fixing conveyance unit 900 and the transfer unit 800 are pulled out to the front of the image forming apparatus 500, but it is also possible to pull out only the transfer unit 800 in a state in which the fixing conveyance unit 900 is at the mounting position.

Figure 14A:
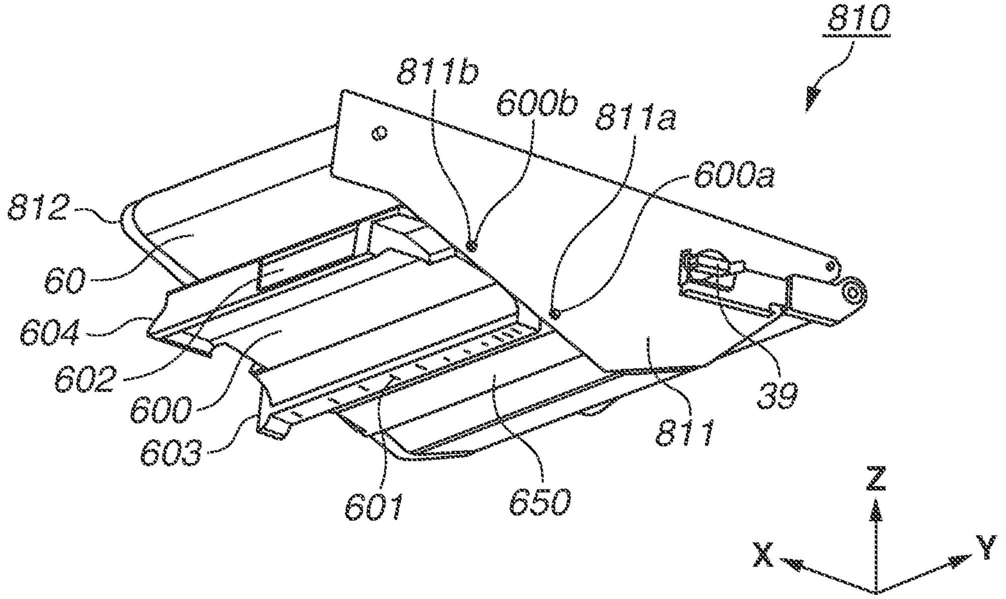
FIGS. 14A and 14B are perspective views illustrating a transfer belt unit according to the second exemplary embodiment.
Figure 14B:
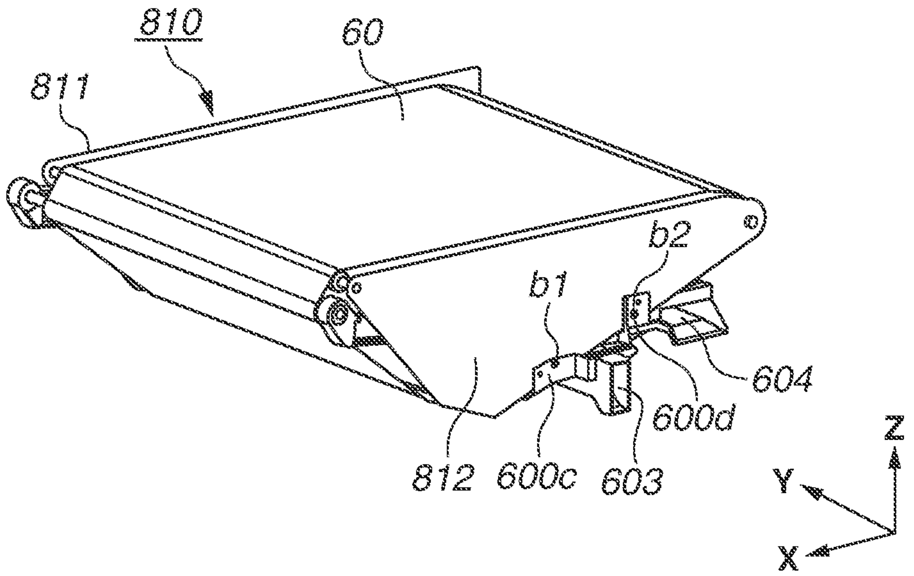

FIGS. 14A and 14B are perspective views of the transfer belt unit 810 pulled out from the support frame 800*b* of the transfer unit 800. FIG. 14A is the perspective view from the front side, and FIG. 14B is the perspective view from the rear side.

As illustrated in FIGS. 14A and 14B, the transfer unit 800 includes a front side plate 811 provided on the front side and a rear side plate 812 provided on the rear side. The front side plate 811 and the rear side plate 812 rotatably support the drive roller 62, the tension roller 63, and the secondary transfer inner roller 64. Thus, the intermediate transfer belt 60 is located between the front side plate 811 and the rear side plate 812 in the front-rear direction (the arrow Y direction).

In the fixing heat exhausting duct 600, front positioning portions 600*a* and 600*b* provided on the front side in the front-rear direction (the arrow Y direction) are respectively inserted into holes 811*a* and 811*b* of the front side plate 811 as illustrated in FIG. 14A. Accordingly, the fixing heat exhausting duct 600 is positioned with respect to the front side plate 811. According to the present exemplary embodiment, the front positioning portions 600*a* and 600*b* are pins that are inserted through the holes 811*a* and 811*b*.

Further, in the fixing heat exhausting duct 600, rear positioning portions 600*c* and 600*d* provided on the rear side in the front-rear direction are respectively fixed by screws b1 and b2 in a state of being positioned with respect to the rear side plate 812 as illustrated in FIG. 14B.

As described above, the fixing heat exhausting duct 600 is positioned and fixed to each of the front side plate 811 and the rear side plate 812 of the transfer belt unit 810. Thus, in a case where the transfer unit 800 is pulled out from the image forming apparatus 500, the fixing heat exhausting duct 600 is pulled out together with the transfer belt unit 810 that supports the intermediate transfer belt 60.

A front end portion and a trailing end portion of the fixing heat exhausting duct 600 are respectively fixed to the front side plate 811 and the rear side plate 812. Accordingly, four corners of the fixing heat exhausting duct 600 are supported in a well-balanced manner, so that it is possible to prevent the four corners of the fixing heat exhausting duct 600 from bending due to its own weight as in the conventional example illustrated in FIG. 17. In addition, even in a case where the above-described fixing conveyance unit 900 is pulled out to the position illustrated in FIG. 12B, the fixing heat exhausting duct 600 does not bend due to its own weight and does not come into contact with an upper surface of the fixing unit 90 when the fixing conveyance unit 900 is slid to move forward. Thus, it is possible to improve the operability of a user when the user slides and moves the fixing conveyance unit 900.

Figure 15A:
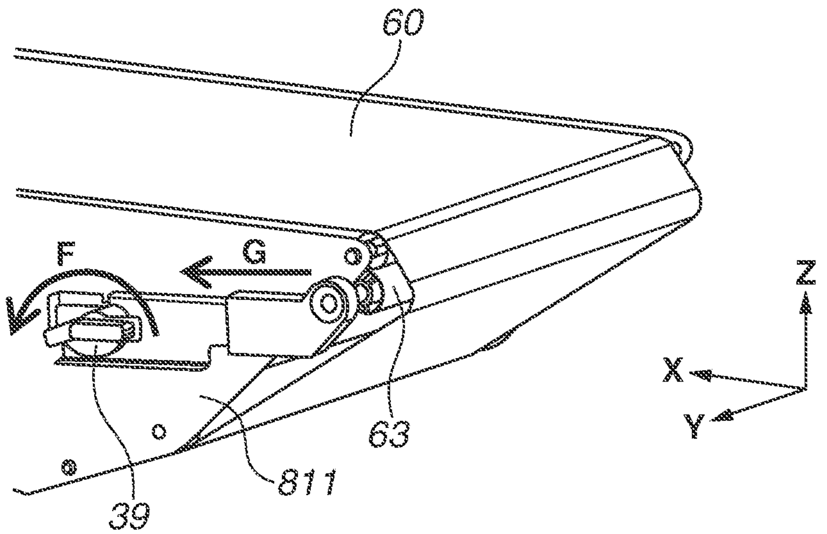
FIGS. 15A and 15B are perspective views illustrating a work procedure for changing an intermediate transfer belt according to the second exemplary embodiment.

In a case where the intermediate transfer belt 60 is replaced, a cam lever 39 is rotated in the arrow F direction as illustrated in FIG. 15A. By this rotating operation of the cam lever 39, the tension roller 63 that applies tension to the intermediate transfer belt 60 is moved in the arrow G direction to retreat from an inner surface of the intermediate transfer belt 60, and the tension applied to the intermediate transfer belt 60 by a force of a spring (not illustrated) is released.

Then, the fixing heat exhausting duct 600 that is positioned and fixed to the front side plate 811 and the rear side plate 812 in the transfer belt unit 810 is removed. Specifically, the screws b1 and b2 are removed, and the front positioning portions 600*a* and 600*b* are removed from the holes 811*a* and 811*b*. Accordingly, the entire outer circumferential surface of the intermediate transfer belt 60 is exposed.

If the fixing heat exhausting duct 600 and the post-secondary transfer upper guide 650 are integrally provided, the work of removing fixing screws and parts can be reduced compared to a case where they are separate components. In other words, if the post-secondary transfer upper guide 650 and the fixing heat exhausting duct 600 are integrated, the working hours of a service person can be minimized.

Figure 15B:
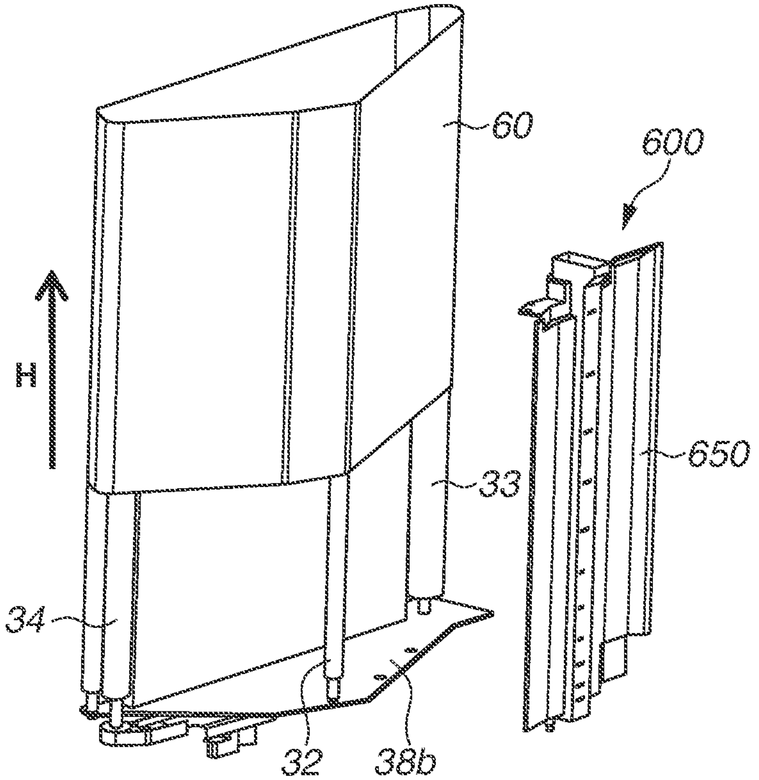

Finally, as illustrated in FIG. 15B, the intermediate transfer belt 60 in the slack state with tension released is removed from the transfer belt unit 810 in the arrow H direction. Subsequently, a new intermediate transfer belt 60 is mounted in the reverse order of the above-described procedure, and replacement work of the intermediate transfer belt 60 is completed.

Configuration of Joint Portion of Air Duct

In order to perform maintenance work such as replacement, a service person can pull out the transfer unit 800 in a forward direction of the image forming apparatus 500 and then can remove the intermediate transfer belt 60 as illustrated in FIG. 13.

Figure 16A:
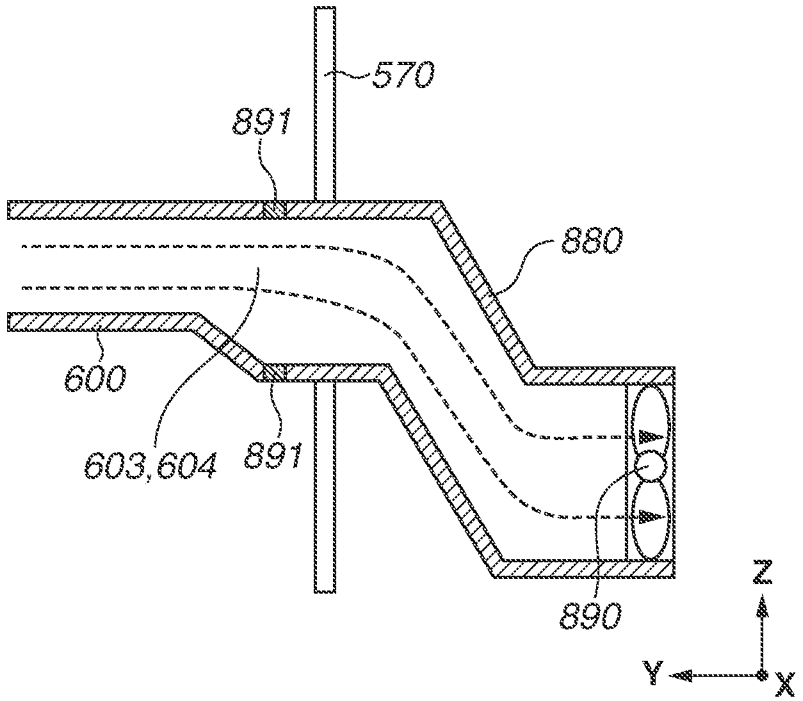
FIGS. 16A and 16B are cross-sectional views illustrating a joint portion of a fixing heat exhausting duct according to the second exemplary embodiment.
Figure 16B:
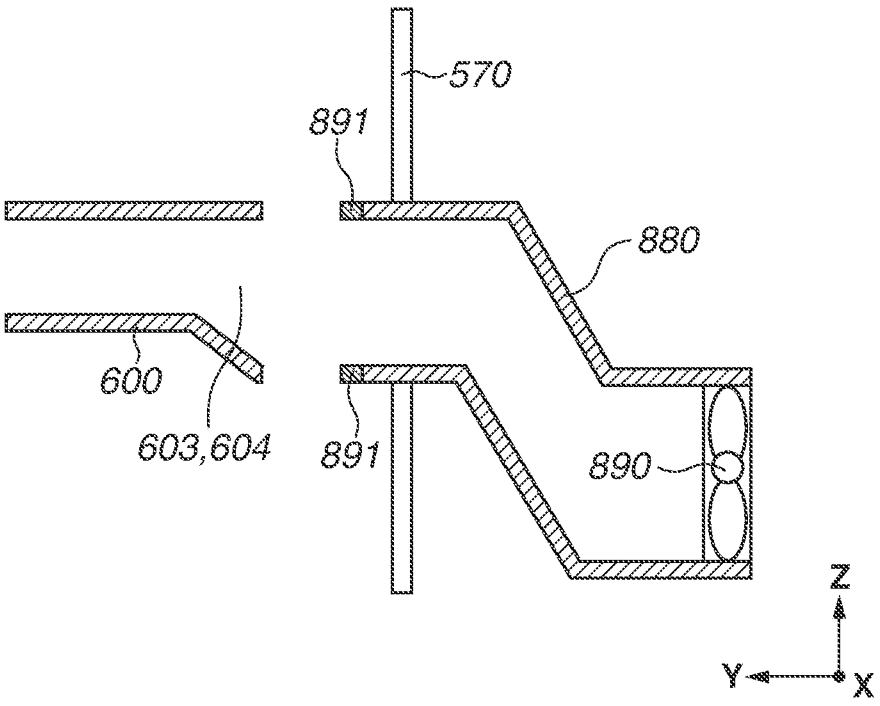

FIGS. 16A and 16B illustrates a relationship between the fixing heat exhausting duct 600 provided to the transfer belt unit 810 and the main body duct 880 provided to the main body frame of the image forming apparatus 500. FIG. 16A is a cross-sectional view illustrating a joint portion of the fixing heat exhausting duct 600 and the main body duct 880 in a state in which the transfer unit 800 is mounted on the image forming apparatus 500 (FIG. 12A). FIG. 16B is a cross-sectional view illustrating the joint portion of the fixing heat exhausting duct 600 and the main body duct 880 in a state in which the transfer unit 800 is pulled out from the image forming apparatus 500 (FIG. 13).

In a state where the transfer unit 800 is mounted on the image forming apparatus 500 as illustrated in FIG. 16A, the main body duct 880 supported by a rear side plate 570 of the main body frame and the fixing heat exhausting duct 600 included in the transfer unit 800 are connected.

In the foregoing mounting state, a fan 890 located inside the main body duct 880 is rotated, and thus the air in the fixing heat exhausting duct 600 is exhausted into the main body duct 880 through the exhaust ports 603 and 604. In other words, the air taken from the air intake ports 601 and 602 of the fixing heat exhausting duct 600 is exhausted to the main body duct 880.

On the other hand, in a case where the transfer unit 800 is pulled out from the image forming apparatus 500 for maintenance work or the like, the fixing heat exhausting duct 600 is separated from the main body duct 880 as illustrated in FIG. 16B. This is because the fixing heat exhausting duct 600 is fixed to the transfer belt unit 810 as described above.

As described above, the fixing heat exhausting duct 600 and the main body duct 880 are arranged facing each other in an insertion/removal direction (the arrow Y direction) of the transfer unit 800 and thus can be connected to and separated from each other along with insertion and removal of the transfer unit 800.

A seal member 891 made of a sponge material or the like is provided at connection portions between the main body duct 880 and the exhaust ports 603 and 604 of the fixing heat exhausting duct 600. Thus, in addition to improving heat shielding efficiency of the fixing heat exhausting duct 600, it is possible to prevent toner from scattering caused by air leaking from the fixing heat exhausting duct 600 to the outside and a conveyance jam, so that the image forming apparatus 500 with excellent high stability can be provided.

In a case where the fixing heat exhausting duct 600 and the post-secondary transfer upper guide 650 are separate components, the work of removing the screws that fix each of the components and removing the components will increase. In other words, the configuration in which the post-secondary transfer upper guide 650 and the fixing heat exhausting duct 600 are integrated as in the present exemplary embodiment can minimize the working hours for a service person to replace the intermediate transfer belt 60.

In the present exemplary embodiment, the fixing heat exhaust duct 600 may be fixed to the cleaner unit 65 as in the first exemplary embodiment. Further, the post-secondary transfer upper guide 650 according to the second exemplary embodiment may be integrated with the air duct 1 according to the first exemplary embodiment.

According to the present disclosure, bending of an air duct can be prevented. According to the present disclosure, in particularly, in a case where a configuration including a transfer unit that can be pulled out from a frame is adopted in a configuration in which an intermediate transfer belt is prevented from being affected by heat of a fixing unit, bending of an air duct can be prevented.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-016882, filed Feb. 7, 2022, which is hereby incorporated by reference herein in its entirety.

What is claimed is:

1. An image forming apparatus comprising:

a photosensitive member;

a transfer unit including:

a transfer belt onto which a toner image formed on a photosensitive member is transferred;

a primary transfer roller that faces the photosensitive member via the transfer belt and forms a primary transfer nip portion for primarily transferring the toner image formed on the photosensitive member to the transfer belt;

a secondary transfer inner roller that is provided below the primary transfer roller in a vertical direction and in contact with an inner circumferential surface of the transfer belt; and a stretching roller for stretching the transfer belt that is provided between the secondary transfer inner roller and the primary transfer roller in a rotation direction of the transfer belt;

a secondary transfer outer roller configured to face the secondary transfer inner roller via the transfer belt and to form a secondary transfer nip portion for secondarily transferring the toner image formed on the transfer belt to a recording material;

a support unit configured to support the transfer unit to move along a rotation axis direction of the secondary transfer inner roller; and an air duct located downstream of the secondary transfer nip portion in a conveyance direction of a recording material and below a portion of the transfer belt stretched between the secondary transfer inner roller and the stretching roller in the vertical direction, wherein the air duct includes an air intake port and is provided in the transfer unit and is configured to move integrally with the transfer unit along with movement of the transfer unit from the support unit.

2. The image forming apparatus according to claim 1, wherein the transfer unit further includes a cleaning unit that is provided downstream of the secondary transfer nip portion in the rotation direction of the transfer belt and is configured to clean an outer circumferential surface of the transfer belt.

3. The image forming apparatus according to claim 2, wherein the air duct is fixed to the cleaning unit.

4. The image forming apparatus according to claim 2, further comprising a guide unit that is provided between the secondary transfer nip portion and the cleaning unit in the conveyance direction of the recording material and is configured to prevent a sheet from sticking to the transfer belt, wherein the air duct is provided integrally with the guide unit.

5. The image forming apparatus according to claim 1, further comprising:

a conveying unit that is located downstream of the secondary transfer nip portion in the conveyance direction and is configured to convey the recording material onto which the toner image is transferred at the secondary transfer nip portion; and a conveyance unit configured to include the conveying unit and the secondary transfer outer roller and to be supported by the support unit to be movable along a rotation axis direction of the secondary transfer outer roller.

6. The image forming apparatus according to claim 5, wherein the air duct is provided between the portion of the transfer belt stretched between the secondary transfer inner roller and the stretching roller and the conveying unit in the vertical direction.

7. The image forming apparatus according to claim 6, wherein the air intake port is provided outside an end portion of the transfer belt in the rotation axis direction of the secondary transfer inner roller.

8. The image forming apparatus according to claim 5, further comprising a fixing unit that is provided in the conveyance unit and is configured to fix the toner image to the recording material conveyed by the conveying unit, wherein the air duct is provided between the portion of the transfer belt stretched between the secondary transfer inner roller and the stretching roller and the fixing unit in the vertical direction.

9. The image forming apparatus according to claim 8, wherein the fixing unit includes a heating unit, a first rotating member to be heated by the heating unit, and a second rotating member that forms a fixing nip together with the first rotating member, and wherein the air intake port is provided upstream of the fixing nip in the conveyance direction of the recording material.

10. The image forming apparatus according to claim 9, wherein the air duct includes another air intake port provided downstream of the fixing nip in the conveyance direction of the recording material.

11. The image forming apparatus according to claim 8, wherein the transfer unit is configured to move between a mounting position where the secondary transfer nip portion is formed by the secondary transfer inner roller and the secondary transfer outer roller and a pull-out position where the transfer unit is moved from the mounting position and pulled out forward from the image forming apparatus, wherein the transfer unit includes an operating lever configured to be rotated in a state in which the transfer unit is located at the mounting position to move the transfer belt in a direction away from the photosensitive member, and wherein the transfer unit is configured to move to the pull-out position in a state in which the operating lever is rotated.

12. The image forming apparatus according to claim 11, wherein the air duct includes an exhaust port configured to exhaust air taken from the air intake port, the image forming apparatus further comprising a duct unit, wherein the duct unit includes another air intake port configured to be joined to the exhaust port in a state in which the transfer unit is located at the mounting position and to be separated from the exhaust port in a state in which the transfer unit is located at the pull-out position and includes a fan configured to form an airflow inside the air duct in the state in which the transfer unit is located at the mounting position.

13. The image forming apparatus according to claim 12, further comprising:

a first housing configured to include the photosensitive member, the transfer unit, and the conveying unit; and a second housing configured to include the fixing unit, wherein the air duct is provided between the transfer belt and the fixing unit in the conveyance direction of the recording material, wherein the air duct includes another air intake port different from the air intake port, and wherein the image forming apparatus further comprises another duct unit that includes another exhaust port configured to be joined to the another air intake port in a state in which the transfer unit is located at the mounting position and to be separated from the another air intake port in a state in which the transfer unit is located at the pull-out position.

14. The image forming apparatus according to claim 12, further comprising:

a first housing configured to include the photosensitive member, the transfer unit, and the conveying unit; and a second housing configured to include the fixing unit, wherein the air duct is provided between the transfer belt and the fixing unit in the conveyance direction of the recording material in the secondary transfer nip portion, wherein the air duct includes another air intake port different from the air intake port, and wherein the image forming apparatus further comprises another duct unit that includes another exhaust port configured to be joined to the another air intake port in a state in which the transfer unit is located at the mounting position and to be separated from the another air intake port in a state in which the transfer unit is located at the pull-out position.

* * * * *